United States Patent
Yoshimura et al.

(10) Patent No.: US 10,805,955 B2
(45) Date of Patent: Oct. 13, 2020

(54) TERMINAL APPARATUS, BASE STATION APPARATUS, COMMUNICATION METHOD, AND INTEGRATED CIRCUIT

(71) Applicants: Sharp Kabushiki Kaisha, Sakai, Osaka (JP); FG Innovation Company Limited, Tuen Mun, New Territories (HK)

(72) Inventors: Tomoki Yoshimura, Sakai (JP); Wataru Ouchi, Sakai (JP); Shoichi Suzuki, Sakai (JP); Liqing Liu, Sakai (JP); Kimihiko Imamura, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 20 days.

(21) Appl. No.: 16/324,152

(22) PCT Filed: Aug. 9, 2017

(86) PCT No.: PCT/JP2017/029006
§ 371 (c)(1),
(2) Date: Feb. 8, 2019

(87) PCT Pub. No.: WO2018/030492
PCT Pub. Date: Feb. 15, 2018

(65) Prior Publication Data
US 2019/0174540 A1    Jun. 6, 2019

(30) Foreign Application Priority Data
Aug. 9, 2016    (JP) .................................. 2016-156243

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1819* (2013.01); *H04L 5/0055* (2013.01);
(Continued)

(58) Field of Classification Search
CPC ............. H04W 74/0808; H04W 52/50; H04W 72/0473; H04W 52/262; H04W 72/14;
(Continued)

(56) References Cited

U.S. PATENT DOCUMENTS

2016/0066282 A1    3/2016 Ouchi et al.
2017/0223564 A1*   8/2017 Dinan .................... H04W 48/16
(Continued)

FOREIGN PATENT DOCUMENTS

WO    2015/008804 A1    1/2015

OTHER PUBLICATIONS

Official Communication issued in International Patent Application No. PCT/JP2017/029006, dated Oct. 31, 2017.
(Continued)

*Primary Examiner* — Maharishi V Khirodhar
*Assistant Examiner* — Kenneth P Hunt
(74) *Attorney, Agent, or Firm* — ScienBiziP, P.C.

(57) ABSTRACT

An apparatus includes: a transmitter configured to transmit a transport block on PUSCH; and a physical layer processing unit configured to calculate transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource
(Continued)

element corresponding to a second SC-FDMA symbol following the first SC-FDMA symbol.

6 Claims, 12 Drawing Sheets

(51) Int. Cl.
| | |
|---|---|
| *H04L 5/00* | (2006.01) |
| *H04W 52/14* | (2009.01) |
| *H04W 72/04* | (2009.01) |
| *H04W 72/14* | (2009.01) |
| *H04L 27/26* | (2006.01) |
| *H04W 52/50* | (2009.01) |
| *H04B 7/06* | (2006.01) |

(52) U.S. Cl.
CPC .......... *H04L 27/26* (2013.01); *H04W 52/146* (2013.01); *H04W 52/50* (2013.01); *H04W 72/0406* (2013.01); *H04W 72/0446* (2013.01); *H04W 72/0473* (2013.01); *H04W 72/14* (2013.01); *H04B 7/0626* (2013.01); *H04B 7/0632* (2013.01); *H04B 7/0639* (2013.01); *H04L 27/2607* (2013.01)

(58) Field of Classification Search
CPC ........... H04W 72/0446; H04W 52/146; H04W 72/0406; H04W 74/0816; H04W 74/0825; H04W 52/04–60; H04L 5/001; H04L 1/1819; H04L 5/0055; H04L 27/26; H04L 27/0006; H04L 27/2607; H04L 27/2636; H04B 7/0632; H04B 7/0626; H04B 7/0639

See application file for complete search history.

(56) References Cited

U.S. PATENT DOCUMENTS

| | | | |
|---|---|---|---|
| 2017/0223672 A1* | 8/2017 | Dinan ................... | H04L 1/1822 |
| 2018/0049206 A1* | 2/2018 | Yerramalli ........ | H04W 72/0413 |
| 2019/0044639 A1* | 2/2019 | Ouchi .................. | H04J 11/0073 |
| 2019/0159143 A1* | 5/2019 | Li ....................... | H04W 52/367 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Apr. 2016, 157 pages.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.1.0, Apr. 2016, 130 pages.

"3rd Generation Partnership Project; Technical Specification Group Radio Access Network; Evolved Universal Radio Access (E-UTRA); Physical layer procedures (Release 13)", 3GPP TS 36.213 V13.1.1, May 2016, 363 pages.

Ericsson et al., "New Work Item on enhanced LAA for LTE", 3GPP TSG RAN Meeting #70, RP-152272, Dec. 7-10, 2015, 8 pages.

Sharp, "UCI transmission on LAA carrier", 3GPP TSG RAN WG1 Meeting #85, R1-164994, May 23-27, 2016, pp. 1-4.

Huawei et al., "Discussion on PUSCH transmission starting within symbol #0", 3GPP TSG RAN WG1 Meeting #85, R1-164828, May 23-27, 2016, 3 pages.

Nokia et al., "Channel Access for LAA UL", 3GPP TSG RAN WG1 Meeting #84bis, R1-162920, Apr. 11-15, 2016, pp. 1-9.

Motorola Mobility, "Introduction of D2D (ProSe) feature into 36.213", 3GPP TSG RAN WG1 Meeting #80, R1-150962, Feb. 9-13, 2015, 4 pages.

Huawei, et al.; "On the need of reservation signal"; 3GPP TSG RAN WG1; Meeting #85; R1-164815; May 23-27, 2016; 3 pages.

3rd Generation Partnership Project; Technical Specification Group Radio Access Network; Evolved Universal Terrestrial Radio Access (E-UTRA); Physical layer procedures (Release 13); 3GPP TS 36.213; vol. 13.1.1; Mar. 2016; 5 pages.

3rd Generation Partnership Project; Technical Specification Group Radio Access Network; Evolved Universal Terrestrial Radio Access (E-UTRA); Multiplexing and channel coding (Release 13); 3GPP TS 36.212; vol. 13.1.0; Mar. 2016; 4 pages.

* cited by examiner

US 10,805,955 B2

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-156243 filed on Aug. 9, 2016, the contents of which are incorporated herein by reference.

BACKGROUND ART

A radio access method and a radio network for cellular mobile communications (hereinafter, referred to as "Long Term Evolution (LTE: Registered Trademark)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In LTE release 13, carrier aggregation has been specified which is a technique that allows a terminal apparatus to perform simultaneous transmission and/or reception in multiple serving cells (component carriers) (NPL 1, 2, and 3). In LTE release 14, extensions of the Licensed Assisted Access (LAA) and carrier aggregation using uplink carriers in an unlicensed band have been studied (NPL 4). In NPL 5 the transmission of HARQ-ACK feedback to the uplink carriers in an unlicensed band on PUSCH, based on a trigger by a base station apparatus is disclosed. In NPL 6, it is disclosed that a part of PUSCH (e.g., a head symbol of PUSCH) is not transmitted by LBT.

CITATION LIST

Non Patent Literature

NPL 1: "3GPP TS 36.211 V13.1.0 (2016-03)", 29 Mar. 2016.
NPL 2: "3GPP TS 36.212 V13.1.0 (2016-03)", 29 Mar. 2016.
NPL 3: "3GPP TS 36.213 V13.1.1 (2016-03)", 31 Mar. 2016.
NPL 4: "New Work Item on enhanced LAA for LTE", RP-152272, Ericsson, Huawei, 3GPP TSG RAN Meeting #70, Sitges, Spain, 7-10 Dec. 2015.
NPL 5: "UCI transmission on LAA carrier", R1-164994, Sharp, 3GPP TSG RAN1 Meeting #85, Nanjing, China, 23-27 May 2016.
NPL 6: "Discussion on PUSCH transmission starting within symbol #0", R1-164828, Huawei, HiSilicon, 3GPP TSG RAN WG1 Meeting #85, Nanjing, China, 23-27 May 2016.

SUMMARY OF INVENTION

Technical Problem

One aspect of the present invention provides a terminal apparatus capable of efficiently performing an uplink transmission, a communication method used for the terminal apparatus, an integrated circuit mounted on the terminal apparatus, a base station apparatus capable of efficiently receiving an uplink transmission, a communication method used for the base station apparatus, and an integrated circuit mounted on the base station apparatus.

Solution to Problem (1) According to some aspects of the present invention, the following measures are provided. Specifically, a first aspect of the present invention is a terminal apparatus including: a transmitter configured to transmit a transport block on PUSCH; and a physical layer processing unit configured to calculate transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(2) A second aspect of the present invention is a base station apparatus including: a receiver configured to receive a transport block transmitted on PUSCH; and a physical layer processing unit configured to calculate transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(3) A third aspect of the present invention is a communication method used for a terminal apparatus, the communication method including the steps of: transmitting a transport block on PUSCH; and calculating transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(4) A fourth aspect of the present invention is a communication method used for a base station apparatus, the communication method including the steps of: receiving a transport block transmitted on PUSCH; and calculating transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

Advantageous Effects of Invention

According to one aspect of the present invention, a terminal apparatus can efficiently perform uplink transmission. The base station apparatus can efficiently receive uplink transmission.

DESCRIPTION OF EMBODIMENTS

Embodiments of the present invention will be described below. In the embodiments of the present invention, "SC-FDMA symbols being transmitted" may mean time continuous signals of the SC-FDMA symbols being transmitted. "SC-FDMA symbols being transmitted" may mean time continuous signals generated based on the contents of resource elements corresponding to the SC-FDMA symbols being transmitted.

Figure 1:
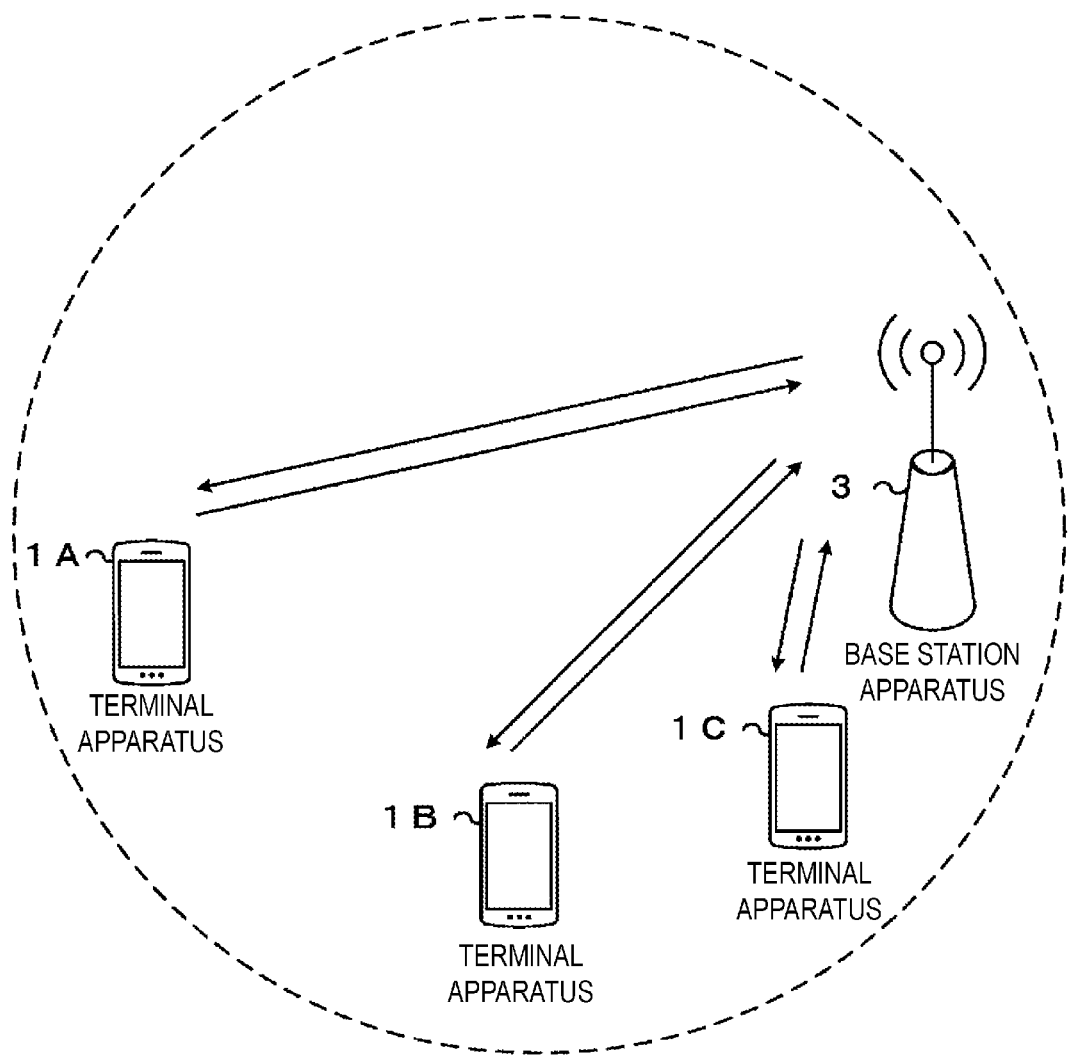
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Each of the terminal apparatuses 1A to 1C is referred to as a terminal apparatus 1.

Hereinafter, carrier aggregation will be described.

According to the present embodiment, multiple serving cells are configured for the terminal apparatus 1. A technology in which the terminal apparatus 1 communicates via the multiple serving cells is referred to as cell aggregation or carrier aggregation. One aspect of the present invention may be applied to each of the multiple serving cells configured for the terminal apparatus 1. One aspect of the present invention may be applied to some of the multiple serving cells configured. One aspect of the present invention may be applied to each of groups of the multiple serving cells configured. One aspect of the present invention may be applied to some of groups of the multiple serving cells configured. The multiple serving cells includes at least one primary cell. The multiple serving cells may include one or multiple secondary cells. The multiple serving cells may include one or more Licensed Assisted Access (LAA) cells. An LAA cell is also referred to as a LAA secondary cell.

The primary cell is a serving cell in which an initial connection establishment procedure has been performed, a serving cell in which a connection re-establishment procedure has been started, or a cell indicated as a primary cell in a handover procedure. The secondary cell(s) and/or LAA cell(s) may be configured at a point of time when or after a Radio Resource Control (RRC) connection is established. The primary cell may be included in a licensed band. The LAA cell(s) may be included in an unlicensed band. The secondary cell(s) may be included in either a licensed band or an unlicensed band. The LAA cell may be referred to as a LAA secondary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Physical channels and physical signals according to the present embodiment will be described.

In FIG. 1, in uplink radio communication from the terminal apparatus 1 to the base station apparatus 3, the following uplink physical channels are used. The uplink physical channels are used for transmitting information output from a higher layer.

Physical Uplink Shared Channel (PUSCH)
Physical Random Access Channel (PRACH)

The PUSCH is used for transmitting uplink data (Transport block, Uplink-Shared Channel (UL-SCH)), the Channel State Information (CSI) of downlink, and/or the Hybrid Automatic Repeat reQuest (HARQ-ACK). The CSI, as well as the HARQ-ACK, is Uplink Control Information (UCI).

The CSI includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI indicates the number of valid layers determined by the terminal apparatus 1. The PMI indicates a code book determined by the terminal apparatus 1. The code book is associated with precoding of PDSCH.

The HARQ-ACK corresponds to downlink data (Transport block, Medium Access Control Protocol Data Unit: MAC PDU, Downlink-Shared Channel: DL-SCH, Physical Downlink Shared Channel: PDSCH). The HARQ-ACK indicates an acknowledgement (ACK) or a negative-acknowledgement (NACK). The HARQ-ACK is also referred to as ACK/NACK, HARQ feedback, HARQ acknowledge, HARQ information, or HARQ control information.

The PRACH is used to transmit a random access preamble.

In FIG. 1, the following uplink physical signal is used in the uplink radio communication. The uplink physical signal is not used for transmitting information output from the higher layer, but is used by the physical layer.

Demodulation Reference Signal (DMRS)

The DMRS is associated with transmission of the PUSCH. The DMRS is time-multiplexed with the PUSCH. The base station apparatus 3 may use the DMRS in order to perform channel compensation of the PUSCH.

In FIG. 1, the following downlink physical channels are used for downlink radio communication from the base station apparatus 3 to the terminal apparatus 1. The downlink physical channels are used for transmitting information output from the higher layer.

Physical Downlink Control Channel (PDCCH)

The PDCCH is used to transmit Downlink Control Information (DCI). The downlink control information is also referred to as DCI format. The downlink control information includes an uplink grant. The uplink grant may be used for scheduling a single PUSCH within a single cell. The uplink grant may be used for scheduling multiple PUSCHs in consecutive subframes within a single cell. The uplink grant may be used for scheduling of a single PUSCH within the fourth or later subframe from the subframe in which the uplink grant is transmitted.

In one aspect of the present invention, the DCI used for scheduling a PUSCH (or a subframe) may include information indicating that a part of time continuous signals of a SC-FDMA symbol included in the PUSCH is not transmitted. For example, the information indicating that a part of time continuous signals of a SC-FDMA symbol included in the PUSCH is not transmitted may be information indicating a SC-FDMA symbol (Starting symbol) that starts the transmission. For example, the information indicating that a part of time continuous signals of a SC-FDMA symbol included in the PUSCH is not transmitted may be information indicating a transmission ending symbol.

For example, the information indicating that a part of time continuous signals of a SC-FDMA symbol included in the PUSCH is not transmitted may be information indicating that dummy signals are transmitted in some of the time continuous signals of some SC-FDMA symbols included in the PUSCHs. For example, the dummy signals may be extended Cyclic Prefixes (CPs) of the SC-FDMA symbol following a part of SC-FDMA symbols included in the PUSCHs, or time continuous signals generated based on the contents of resource elements corresponding to the SC-FDMA symbol following a part of SC-FDMA symbols included in the PUSCHs.

In one aspect of the present invention, the DCI used for scheduling one PUSCH (one subframe) is also referred to as DCI format 0A or DCI format 4A.

In one aspect of the present invention, the DCI used for scheduling multiple PUSCHs (multiple subframes) is also referred to as DCI format 0B or DCI format 4B. DCI format 0B and DCI format 4B are also collectively referred to as DCI type B.

DCI type B may be used for scheduling multiple consecutive PUSCHs. In a case that the DCI type B schedules multiple PUSCHs, the information included in the DCI and indicating that some SC-FDMA symbols included in the PUSCHs are not transmitted may be applied only to some of the multiple the PUSCHs.

The UL-SCH is a transport channel. A channel used in a Medium Access Control (MAC) layer is referred to as a transport channel. A unit of the transport channel used in the MAC layer is also referred to as a transport block (TB) or a MAC Protocol Data Unit (PDU).

A configuration of the radio frame according to the present embodiment will be described below.

Figure 2:
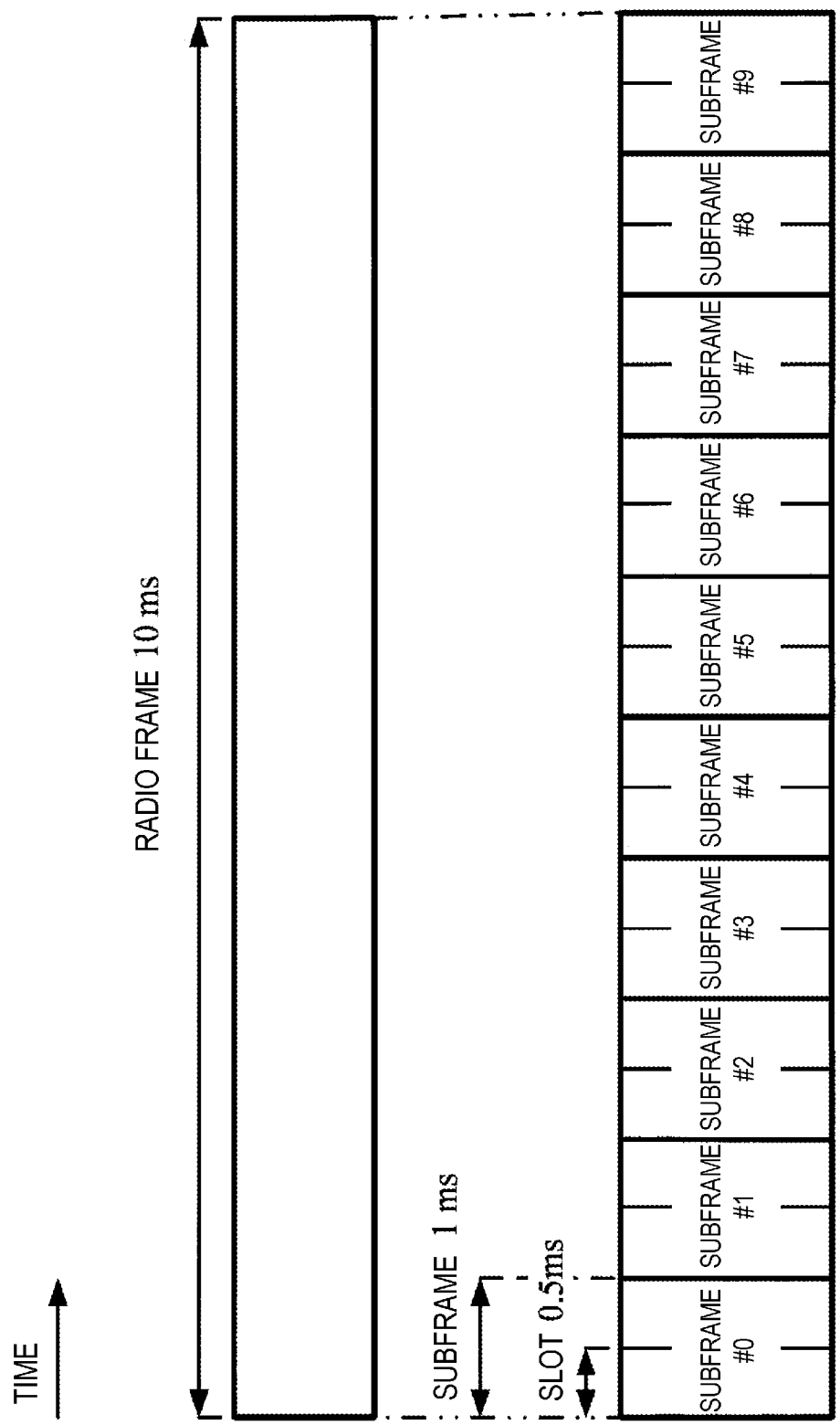
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames is 10 ms in length. Each of the radio frames is constituted of 10 subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes are available in each 10 ms interval.

Figure 3:
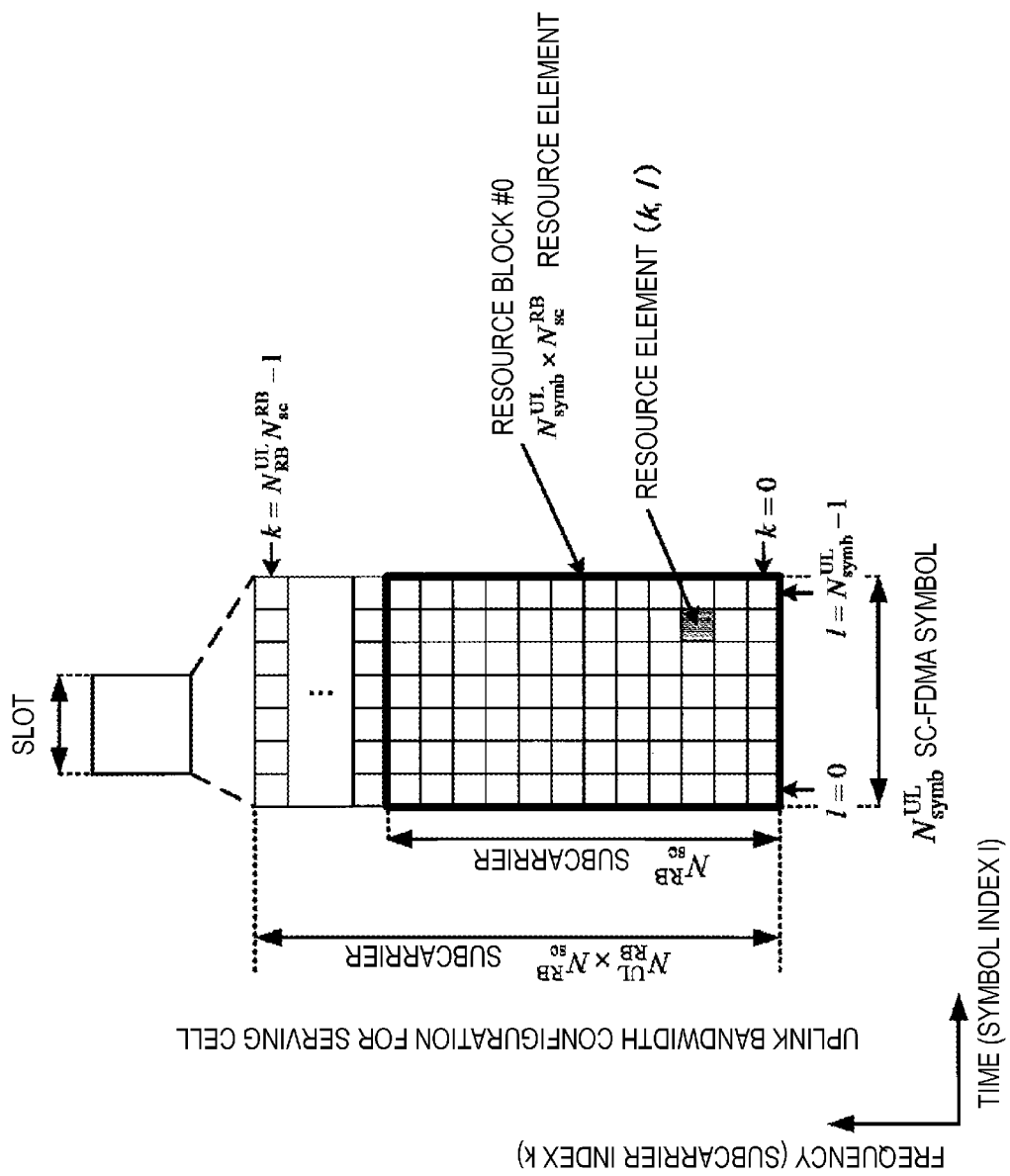
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. In FIG. 3, l is an SC-FDMA symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by a subcarrier number/index k and an SC-FDMA symbol number/index l.

The uplink slot includes multiple SC-FDMA symbols l (l=0, 1, . . . , $N^{UL}_{symb}$) in the time domain. $N^{UL}_{symb}$ indicates the number of SC-FDMA symbols included in one uplink slot. For a normal Cyclic Prefix (CP) in the uplink, $N^{UL}_{symb}$ is 7. For an extended CP in the uplink, $N^{UL}_{symb}$ is 6.

The terminal apparatus 1 receives the parameter UL-CyclicPrefixLength indicating the CP length in the uplink from the base station apparatus 3. The base station apparatus 3 may broadcast, in the cell, system information including the parameter UL-CyclicPrefixLength corresponding to the cell.

The uplink slot includes the multiple subcarriers k (k=0, 1, . . . , $N^{UL}_{RB} \times N^{RB}_{SC}$) in the frequency domain. $N^{UL}_{RB}$ is an uplink bandwidth configuration for the serving cell expressed by a multiple of $N^{RB}_{SC}$. $N^{RB}_{SC}$ is the (physical) resource block size in the frequency domain expressed by the number of subcarriers. The subcarrier spacing Δf may be 15 kHz, and $N^{RB}_{sc}$ may be 12. Thus, $N^{RB}_{sc}$ may be 180 kHz.

A resource block (RB) is used to express mapping of a physical channel to resource elements. For the resource block, a virtual resource block (VRB) and a physical resource block (PRB) are defined. A physical channel is first mapped to a virtual resource block. Thereafter, the virtual resource block is mapped to the physical resource block. One physical resource block is defined by $N^{UL}_{symb}$ consecutive SC-FDMA symbols in the time domain and by $N^{RB}_{sc}$ consecutive subcarriers in the frequency domain. Hence, one physical resource block is constituted by ($N^{UL}_{symb} \times N^{RB}_{SC}$) resource elements. One physical resource block corresponds to one slot in the time domain. The physical resource blocks are numbered $n_{PRB}$ (0, 1, . . . , $N^{UL}_{RB}-1$) in ascending order of frequencies in the frequency domain.

The downlink slot according to the present embodiment includes multiple OFDM symbols. Since the configuration of the downlink slot according to the present embodiment is basically the same except that a resource grid is defined by multiple subcarriers and multiple OFDM symbols, the description of the configuration of the downlink slot will be omitted.

Configurations of apparatuses according to the present embodiment will be described below.

Figure 4:
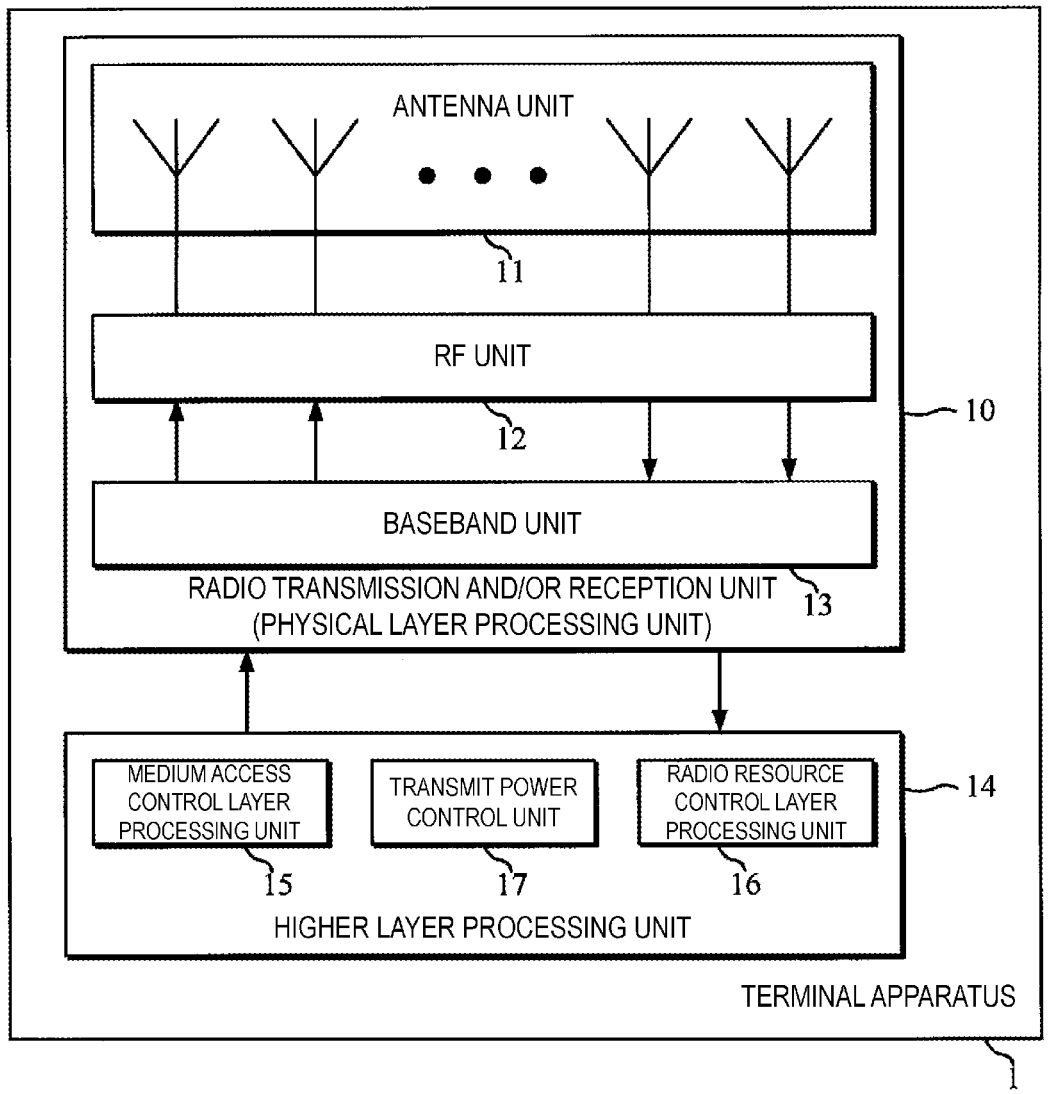
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls random access procedure in accordance with the various configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters, based on higher layer signaling received from the base station apparatus 3. Namely, the radio resource control unit 16 sets the various configuration information/parameters in accordance with the information indicating the various configuration information/parameters received from the base station apparatus 3. The radio resource control layer processing unit 36 generates uplink data (transport block) allocated on a PUSCH, an RRC message, a MAC Control Element (CE), and the like, and outputs the generated data to the radio transmission and/or reception unit 30.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 performs Inverse Fast Fourier Transform (IFFT) of the data, generates a time signal of an SC-FDMA symbol including the CP, generates a digital signal of the baseband, and converts the digital signal of the baseband into an analog signal. The baseband unit 13 outputs the analog signal resulting from the conversion, to the RF unit 12.

Figure 5:
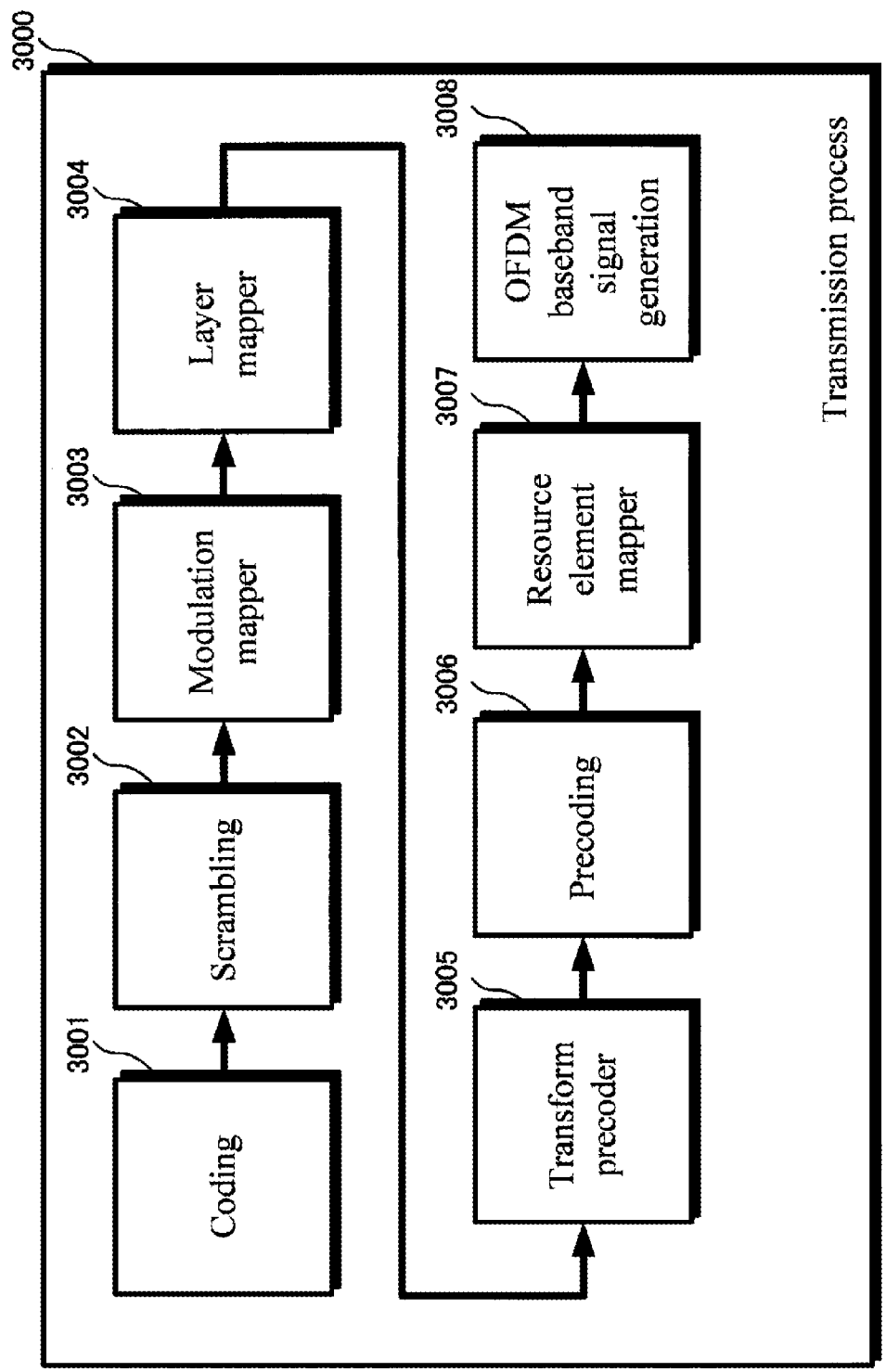
FIG. 5 is a block diagram illustrating an example of a process (transmit process 3000) of a baseband unit 13 according to the present embodiment.

FIG. 5 is a block diagram illustrating an example of a process (transmit process 3000) of a baseband unit 13. Transmission process 3000 is a configuration including at least one of a coding (coding processing unit) 3001, a Scrambling (scrambling processing unit) 3002, a Modulation mapper 3003, a Layer mapper 3004, a Transform precoder 3005, a Precoder 3006, a Resource element mapper 3007, an OFDM baseband signal generation (OFDM baseband signal generation processing unit) 3008.

The Coding 3001 includes a function to code transport block or uplink control information by error correction coding process (turbo coding process, Tail Biting Convolutional Code (TBCC) coding process or iteration code, and the like) and to generate coded bits. The generated coded bits are input into the Scrambling 3002.

The Scrambling 3002 includes a function to convert coded bits into scrambled bits by a scrambling process. The scrambled bits are input into the Modulation mapper 3003.

The Modulation mapper 3003 includes a function to convert the scrambled bit into modulation bits by a modulation mapping process. The modulation bits are obtained by performing modulation processes such as Quaderature Phase Shift Keying (QPSK), Quaderature Amplitude Modulation (16QAM), 64QAM, 256QAM, and the like, to the scrambled bits. Here, the modulation bit is also referred to as a modulation symbol. The modulation bits are input into the Layer mapper 3004.

The Layer mapper 3004 includes a function to map (layer-map) modulation symbols onto each layer. The layer is the index with respect to the multiplicity of a physical layer signal in the spatial domain. That is, for example, in a case that the number of the layers is 1, it means that spatial multiplexing is not performed. In a case that the number of the layers is 2, it means that two kinds of physical layer signals are spatially multiplexed. The layer-mapped modulation symbols (hereafter, the layer-mapped modulation symbol is also referred to as a modulation symbol) are input to the Transform precoder 3005.

The Transform precoder 3005 includes a function to generate complex symbols, based on the modulation symbols and/or NULL signals. A function to generate complex symbols, based on the modulation symbols and/or NULL signals in the Transform precoder 3005 is given by the following Equation (7).

$$y^{(\lambda)}(l \cdot M_{sc}^{PUSCH} + k) = \qquad \text{Equation (1)}$$

$$\frac{1}{\sqrt{M_{sc}^{PUSCH}}} \sum_{i=0}^{M_{sc}^{PUSCH}-1} x^{(\lambda)}(l \cdot M_{sc}^{PUSCH} + i) e^{-j\frac{2\pi i k}{M_{sc}^{PUSCH}}}$$

$$k = 0, \ldots, M_{sc}^{PUSCH} - 1$$

$$l = 0, \ldots, M_{symb}^{layer} / M_{sc}^{PUSCH} - 1$$

In Equation (1), $\lambda$ is the index of the layer, $M^{PUSCH}{}_{SC}$ is the number of subcarriers in the bandwidth of the scheduled PUSCH, $x^{(\lambda)}$ is the modulation symbol in the layer index $\lambda$, i is the index of the modulation symbol, j is an imaginary unit, $M^{layer}{}_{PUSCH}$ is the number of modulation symbols per layer, and $\pi$ is the circumference ratio.

Some of $x^{(\lambda)}$ may be NULL. Here, some of $x^{(\lambda)}$ being NULL may mean that zero (a complex number or an actual number) is substituted for some of $x^{(\lambda)}$. For example, in a case that the modulation symbol generated by the Layer mapper 3004 or the Modulation mapper 3003 is $x^{(\lambda)}{}_0$, it may be $x^{(\lambda)} = [O_m, x^{(\lambda)}{}_0]$. Here, $O_m$ may be a sequence constituted of one or multiple zeros. Here, [A, B] is an operation to output the sequence where the sequence A and the sequence B are combined. The complex symbols are input into the Precoder 3006.

The Precoder 3006 generates a transmission symbol for every transmit antenna by multiplying a complex symbol by a precoder. The transmission symbols are input into the Resource element mapper 3007.

The Resource element mapper 3007 maps the transmission symbol every transmit antenna port onto a resource element respectively.

The baseband signal generation 3008 includes a function to convert a modulation symbol mapped to a resource element into a baseband signal (time continuous signal). The baseband signal generation 3008 generates a time continuous signal, based on the contents (e.g., a modulation symbol) of the resource element corresponding to the SC-FDMA symbol by Equation (2).

$$s_l^{(p)}(t) = \sum_{k=-\text{floor}(N_{RB}^{UL} N_{sc}^{RB}/2)}^{\text{ceil}(N_{RB}^{UL} N_{sc}^{RB}/2)-1} a_{k^{(-)},l_{second}}^{(p)} \cdot e^{j2\pi(k+\frac{1}{2})\Delta f(t - N_{CP,l}^X T_s)} \qquad \text{Equation (2)}$$

Here, $s^{(p)}{}_l$ is a time continuous signal at the time t of the SC-FDMA symbol l, generated based on contents corresponding to the SC-FDMA symbol $l_{second}$, at the antenna port p. $N^{UL}{}_{RB}$ is the number of the resource blocks of the uplink band, $N^{RB}{}_{sc}$ is the number of the subcarrier of the resource block, ceil ( ) is a ceiling function, floor ( ) is a floor function, $a^{(p)}{}_k{}^{(-)}{}_{,l}$ is contents of the resource element (k, l) at the antenna port p, and $l_{second}$ is the index of the SC-FDMA symbol. In addition, $\Delta f=15$ kHz. In addition, $N_{CP,l}$ is the CP length of the SC-FDMA symbol l. In addition, $T_s=1/(15,000*2,048)$. The time t includes a value within the range from $T_{1,0}$ to $(N_{CP,l}+N)*T_s$. Here, $T_{1,0}$ is the time when transmission of the SC-FDMA symbol is started. For example, it may be $T_{1,0}=0$. In addition, $N^X{}_{CP,l}$ is a parameter of time continuous signal generation of the SC-FDMA symbol, for example, it may be $N^X{}_{CP,l}=N_{CP,l}$.

$N_{CP,l}$ may be 160 in a case that l=0 in a normal CP. $N_{CP,l}$ may be 144 in a case that l=1 to 6 in a normal CP. $N_{CP,l}$ may be 512 in a case that l=0 to 5 in an extended CP.

The RF unit 12 removes unnecessary frequency components from the analog signal input from the baseband unit 13 using a low-pass filter, up-converts the analog signal into a signal of a carrier frequency, and transmits the up converted signal via the antenna unit 11. Furthermore, the RF unit 12 amplifies power. Furthermore, the RF unit 12 may have a function of controlling transmit power. The RF unit 12 is also referred to as a transmit power control unit.

Figure 6:
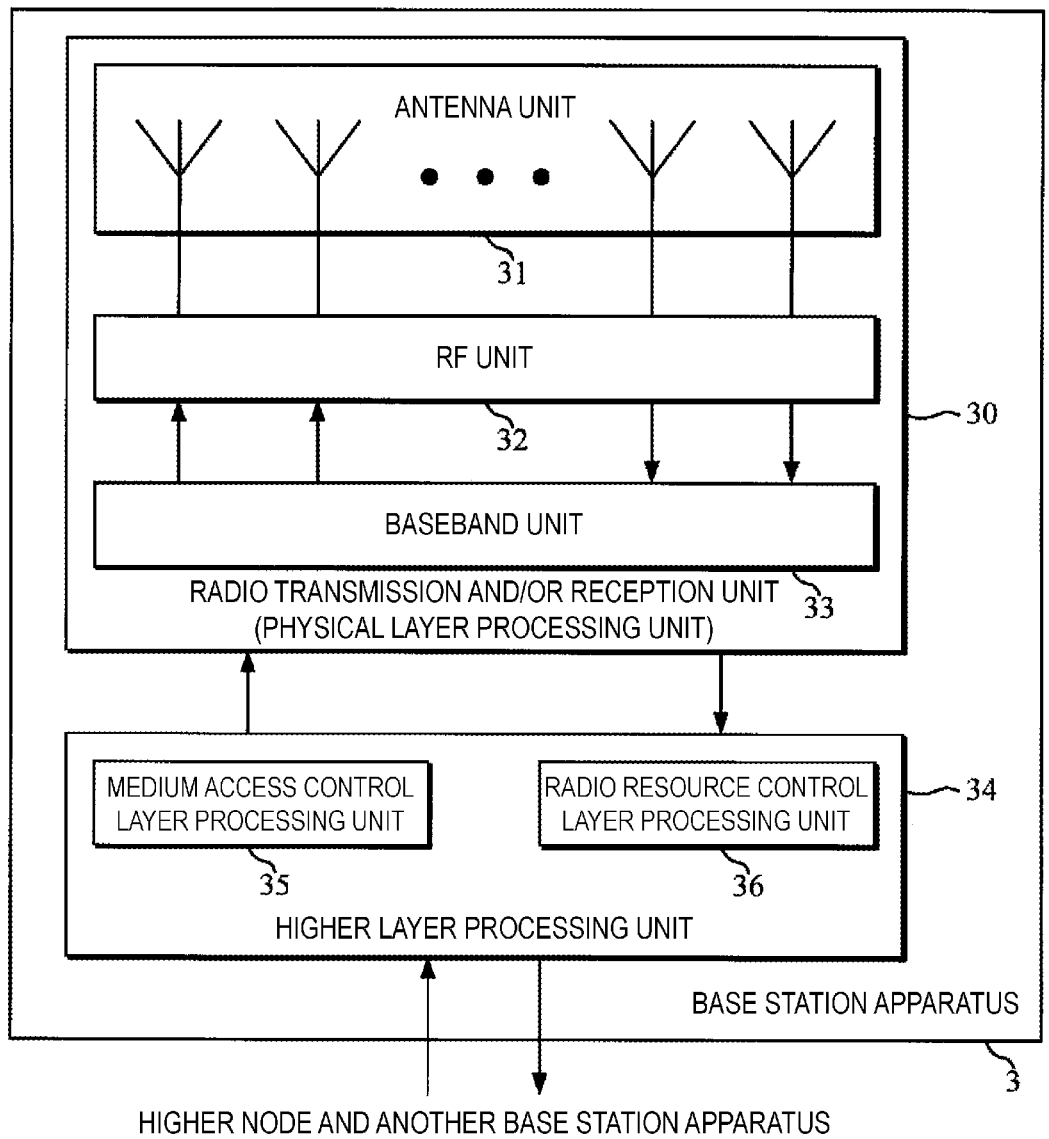
FIG. 6 is a schematic block diagram illustrating a configuration of a base station apparatus 3 according to the present embodiment.

FIG. 6 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The radio resource control layer processing unit 36 included in the higher layer processing unit 34 performs processing of the Radio Resource Control layer. The radio resource control layer processing unit 36 generates, or acquires from a higher node, downlink data (transport block) allocated on a PDSCH, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

In the present embodiment, a group of multiple LAA cells is referred to as a UCI cell group. The HARQ-ACK corresponding to the multiple LAA cells included in the UCI cell group may be transmitted on a PUSCH in one or more LAA cells in the UCI cell group.

The UCI cell group does not always include a primary cell. The base station apparatus 3 may determine whether the UCI cell group includes a LAA cell. The base station apparatus 3 may transmit information/higher layer parameter indicating whether the UCI group includes a LAA cell to the terminal apparatus 1.

A CSI request and a HARQ-ACK request may be included in the uplink grant corresponding to the LAA cell included in the UCI cell group. The field mapped to the bits of the CSI request is also referred to as a CSI request field. The field mapped to the bits of the HARQ-ACK request is also referred to as a HARQ-ACK request field.

In a case that the HARQ-ACK request field included in the uplink grant corresponding to the LAA cell included in the UCI cell group is set to trigger HARQ-ACK transmission, the terminal apparatus 1 transmits the HARQ-ACK using PUSCH in the LAA cell. For example, the transmission of HARQ-ACK may not be triggered in a case that 1 bit of the HARQ-ACK request field is set to be '0'. For example, the transmission of HARQ-ACK may be triggered in a case that 1 bit of the HARQ-ACK request field is set to be '1'.

In a case that the CSI request field included in the uplink grant corresponding to the LAA cell included in the UCI cell group is set to trigger CSI reporting, the terminal apparatus 1 performs CSI reporting using PUSCH in the LAA cell. For example, the CSI reporting may not be triggered in a case that 2 bits of the CSI request field is set to be '00'. For example, the CSI reporting may be triggered in a case that 2 bits of the CSI request field is set to be a value except '00'.

A coding process of an uplink data ($a_x$), a CQI/PMI ($o_x$), an RI ($b_x$), and a HARQ-ACK ($c_x$) transmitted using PUSCH will be described below.

Figure 7:
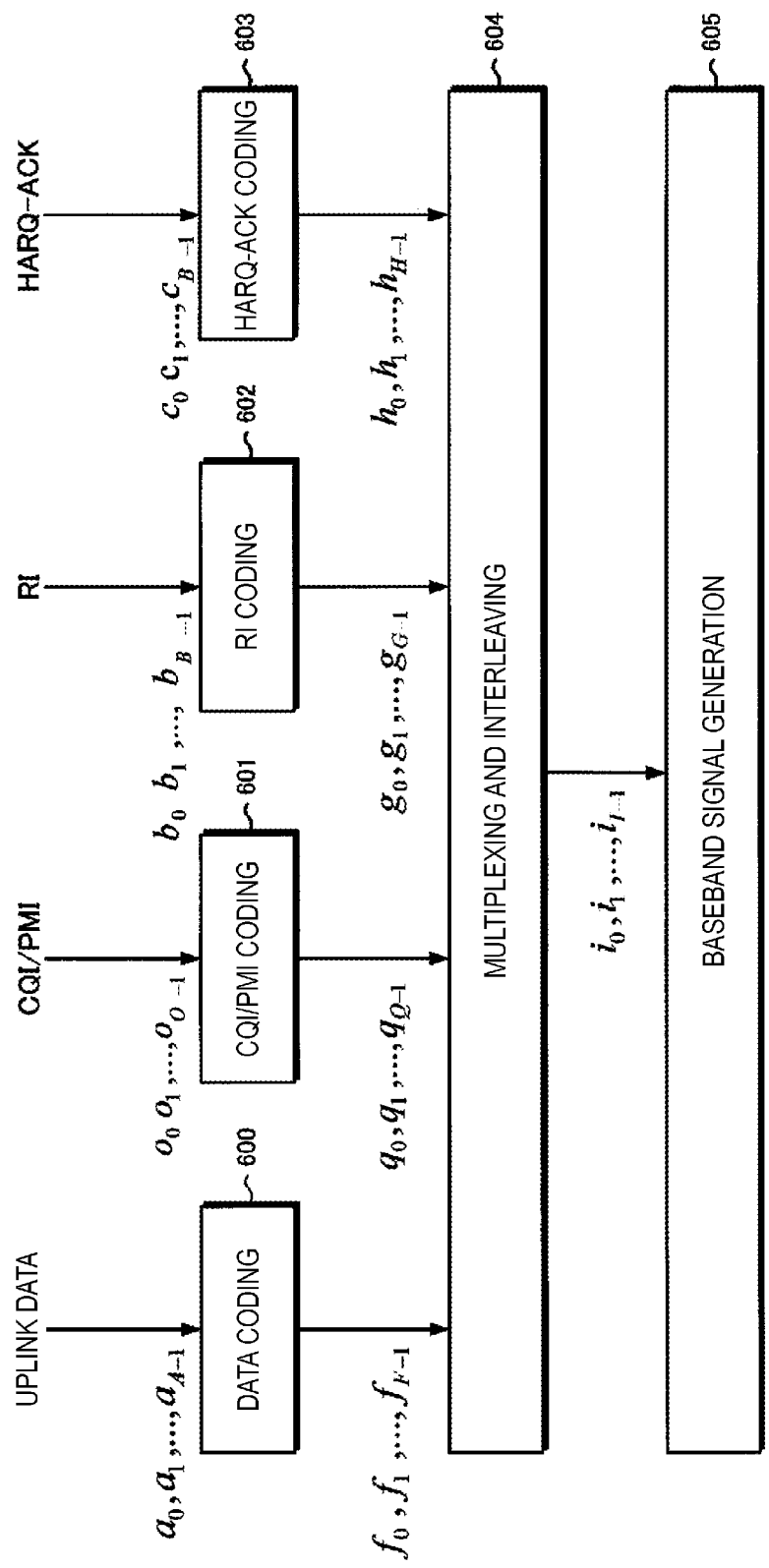
FIG. 7 is a diagram illustrating an example of a coding process of an uplink data ($a_x$), a CQI/PMI ($o_x$), an RI ($a_x$), and a HARQ-ACK ($a_x$) according to the present embodiment.

FIG. 7 is a diagram illustrating an example of a coding process of the uplink data ($a_x$), the CQI/PMI ($o_x$), the RI ($b_x$), and the HARQ-ACK ($c_x$) according to the present embodiment. The uplink data, the CQI/PMI, the RI, and the HARQ-ACK transmitted using PUSCH are coded in 600 to 603 in FIG. 7 individually. Coded bits of the uplink data ($f_x$), coded bits of the CQI/PMI ($q_x$), coded bits of the RI ($g_x$), and coded bits of the HARQ-ACK ($h_x$) are multiplexed and interleaved in 604 in FIG. 7. A baseband signal (a signal of PUSCH) is generated in 605 in FIG. 7 from the coded bits multiplexed and interleaved in 604.

A matrix may be used for multiplexing and interleaving the coded bits. The column of the matrix corresponds to the SC-FDMA symbol. One element of the matrix corresponds to one coding modulation symbol. The coding modulation symbol is a group of X coded bits. X is the modulation order ($Q_m$) corresponding to the PUSCH (uplink data). One complex number symbol is generated from one coding modulation symbol. Multiple complex number symbols generated from multiple coding modulation symbols mapped to one column are assigned to the PUSCH and mapped to the subcarrier after DFT precoding.

Figure 8:
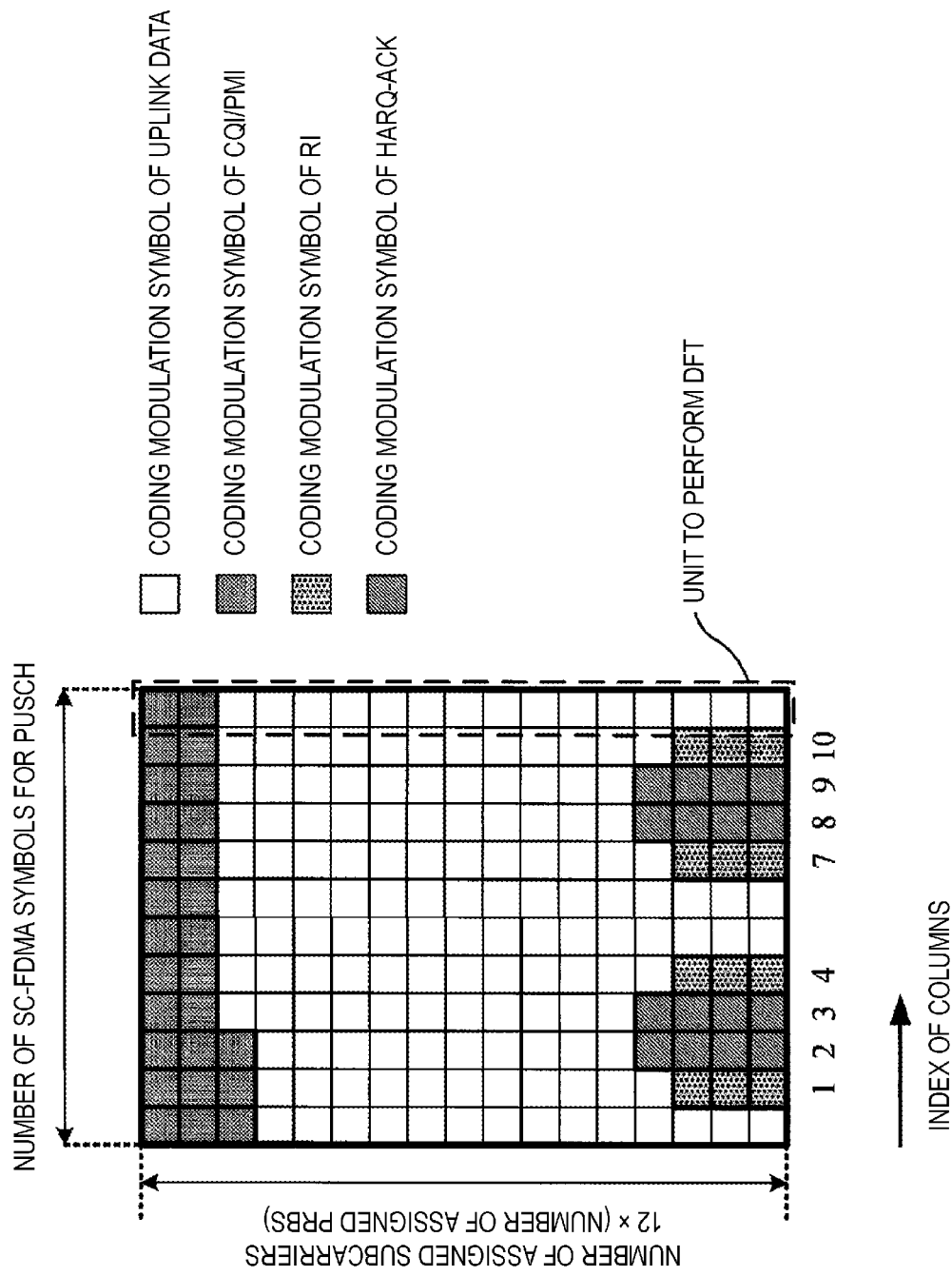
FIG. 8 is the diagram illustrating an example of multiplexing and interleaving of coded bits according to the present embodiment.

FIG. 8 is the diagram illustrating an example of multiplexing and interleaving of coded bits according to the present embodiment. In a case that the HARQ-ACK and the RI are transmitted using PUSCH, the coding modulation symbols of the HARQ-ACK are mapped to columns of indexes {2, 3, 8, 9}, and in addition, the coding modulation symbols of the RI are mapped to columns of indexes {1, 4, 7, 10}.

The columns of indexes {2, 3, 8, 9} correspond to the SC-FDMA symbol next to the SC-FDMA symbol where the DMRS associated with the PUSCH transmission is transmitted. The DMRS is transmitted in the SC-FDMA symbol between the SC-FDMA symbol corresponding to the column of index 2 and the SC-FDMA symbol corresponding to the column of index 3. The DMRS is transmitted in the SC-FDMA symbol between the SC-FDMA symbol corresponding to the column of index 8 and the SC-FDMA symbol corresponding to the column of index 9. The columns of indexes {1, 4, 7, 10} corresponds to the SC-FDMA symbol 2 symbols away from the SC-FDMA symbol where the DMRS associated with the PUSCH transmission is transmitted.

A calculation method of the number of coded bits of the RI (G) and the number of coded bits of the HARQ-ACK (H) will be described below. The number of coded bits of the RI (G) and the number of coded bits of the HARQ-ACK (H) may be given by following Equation (3) and Equation (4). Note that the present embodiment may be applied to the CQI/PMI.

For RI, $G = Q_m \times Q'$

For HARQ-ACK, $H = Q_m \times Q'$  Equation (3)

where
$Q_m$ is the modulation order of a given transport block.

$$Q' = \min\left(\text{ceil}\left(\frac{(O+L) \cdot M_{sc}^{PUSCH\text{-}Initial} \cdot N_{symb}^{PUSCH\text{-}Initial} \cdot \beta_{offset}^{PUSCH}}{\sum_{r=0}^{C-1} K_r}\right), 4 \cdot M_{sc}^{PUSCH}\right)$$  Equation (4)

where
O is the number of RI bits or HARQ-ACK bits, and
L is the number of CRC parity bits given by $$L = \begin{cases} 0 & O \leq 22 \\ 8 & \text{otherwise} \end{cases},$$

and
$M_{sc}^{PUSCH}$ is the scheduled bandwidth for PUSCH transmission in the current subframe for the transport block, expressed as a number of subcarriers, and
$M_{sc}^{PUSCH\text{-}initial}$ is the scheduled bandwidth for initial PUSCH transmission and obtained from the initial PDCCH for the same transport block, and
$N_{symb}^{PUSCH\text{-}initial}$ is the number of SC-FDMA symbols per subframe for initial PUSCH transmission for the same transport block, and
C, and $K_r$ are obtained from the initial PDCCH for the same transport block, and
For RI, $\beta_{offset}^{PUSCH} = \beta_{offset}^{RI}$, and
For HARQ-ACK, $\beta_{offset}^{PUSCH} = \beta_{offset}^{HARQ\text{-}ACK}$.
min ( ) is a function to return the smallest value among the multiple input values. ceil ( ) is a function to return the smallest integer that is bigger than the input value. O is the number of bits of the RI or the number of bits of the HARQ-ACK. L is the number of CRC parity bits added to the RI or the HARQ-ACK. C is the number of code blocks. $K_r$ is the size of the code block r. Multiple code blocks are given by dividing one transport block.

$M_{sc}^{PUSCH\text{-}initial}$ is the bandwidth scheduled for the PUSCH initial transmission, and is obtained from the initial PDCCH for the same transport block. $M_{sc}^{PUSCH\text{-}initial}$ may be expressed by the number of subcarriers. $N_{symbol}^{PUSCH\text{-}initial}$ is the number of SC-FDMA symbols for the PUSCH initial transmission for the same transport block. Here, the same transport block is a transport block transmitted on the PUSCH with the UCI.

$\beta_{offset}^{RI}$ may be given at least based on some or all of the following elements (1) to (5).

Element (1): whether the serving cell where the PUSCH is transmitted belongs to the UCI cell group Element (2): whether the HARQ-ACK transmission is performed using the PUSCH Element (3): the value of the HARQ-ACK request field Element (4): the number of the SC-FDMA symbols for the PUSCH Element (5): the column to which coding modulation symbols of the RI are mapped (the SC-FDMA symbol where the RI is transmitted)

$\beta^{RI}_{offset}$ may be given by information/parameter received from the base station apparatus 3. The terminal apparatus may select one from the multiple $\beta^{RI}_{offset}$ given by information/parameter received from the base station apparatus 3, at least based on some or all of the element (1) to (5) above.

$\beta^{HARQ-ACK}_{offset}$ may be given at least based on some or all of the elements (1) to (5).

$\beta^{HARQ-ACK}_{offset}$ may be given by information/parameter received from the base station apparatus 3. $\beta^{HARQ-ACK}_{offset}$ may be given regardless of element (1) above.

In calculation of the number of CQI/PMI bits, $\beta^{CQI}_{offset}$ may be given at least based on some or all of the elements (1) to (5).

$\beta^{CQI}_{offset}$ may be given by information/parameter received from the base station apparatus 3.

A setting method of the transmit power $P_{PUSCH,c}(i)$ for the PUSCH transmission in subframe i in the serving cell c will be described as follow. The transmit power $P_{PUSCH,c}(i)$ may be given by the following Equation (5).

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{Equation (5)}$$

where, $P_{CMAX,c}(i)$ is the configured UE transmit power in subframe i for serving cell c.

$M_{PUSCH,c}(i)$ is the bandwidth of the PUSCH resource assignment expressed in number of resource blocks valid for subframe i and serving cell c.

$P_{O\_PUSCH,c}(j)$ is a parameter composed of the sum of a component $P_{O\_NOMINAL\_PUSCH,c}(j)$ provided from higher layers and a component $P_{O\_UE\_PUSCH,c}(j)$ provided by higher layers for serving cell c.

$\alpha_c \in \{0, 0.4, 0.5, 0.6, 0.7, 0.8, 0.9, 1\}$ is a 3-bit parameter provided by higher layers for serving cell c.

$PL_c$ is the downlink path loss estimate calculated in the UE for serving cell c in dB.

$f_c(i)$ is derived from a TPC command which is included in PDCCH/EPDCCH with DCI format for serving cell c.

$P_{CMAX,c}(i)$ is the maximum transmit power configured for the terminal apparatus 1 in subframe i in the serving cell c. $M_{PUSCH,c}(i)$ is a bandwidth of PUSCH resource allocation in subframe i in the serving cell c. The PUSCH resource allocation bandwidth is expressed by the number of resource blocks. $P_{O\_PUSCH,c}(j)$ is given based on two parameters provided by the higher layer. $\alpha_c$ is given by a parameter given by the higher layer. $PL_c$ is the downlink path loss estimate for the serving cell c calculated by the terminal apparatus 1. $f_c(i)$ is derived by a TPC command. The TPC command may be included in the DCI format for the serving cell c. $\Delta_{TF,c}$ in Equation (5) may be given by the following Equation (6).

$$\Delta_{TF,c}(i) = \begin{cases} 0 & \text{for } K_s = 0 \\ 10\log_{10}((2^{BPRE \cdot K_s} - 1) \cdot \beta^{PUSCH}_{offset}) & \text{for } K_s = 1.25 \end{cases} \quad \text{Equation (6)}$$

where $K_S$ is given by the parameter deltaMCS-Enabled provided by higher layers for each serving cell c.

$\beta^{PUSCH}_{offset} = \beta^{CQI}_{offset}$ for control data (UCI) sent via PUSCH without UL-SCH data (transport block) and 1 for other cases.

$K_s$ is given by a parameter provided by the higher layer. In a case that the UCI is transmitted via the PUSCH which does not include a transport block, $\beta^{PUSCH}_{offset}$ is given by $\beta^{CQI}_{offset}$. $\beta^{CQI}_{offset}$ may be given by information/parameter received from the base station apparatus 3. $\beta^{CQI}_{offset}$ may be given regardless of element (1) above. In a case that at least a transport block is transmitted via the PUSCH, $\beta^{PUSCH}_{offset}$ is 1. The BPRE in Equation (6) is given by the following Equation (7).

$$BPRE = \begin{cases} O_{CQI}/N_{RE} & \text{for control data (UCI) sent via PUSCH} \\ & \text{without UL-SCH data (transport block)} \\ \sum_{r=0}^{C-1} K_r/N_{RE} & \text{for other case} \end{cases} \quad \text{Equation (7)}$$

where

C, and $K_r$ are obtained from the initial PDCCH for the same transport block, and $O_{CQI}$ is the number of CQI/PMI bits including CRC parity bits.

$N_{RE}$ is the number of resource elements determined as $N_{RE} = M_{sc}^{PUSCH-initial} \cdot N_{symb}^{PUSCH-initial}$.

$O_{CQI}$ is the number of bits of the CQI/PMI including the CRC parity bits. $N_{RE}$ is the number of resource elements. $N_{RE}$ is the product of $M_{sc}^{PUSCH-initial}$ and $N_{symbol}^{PUSCH-initial}$. Thus, the transmit power $P_{PUSCH,c}(i)$ for the PUSCH transmission is given based on $M_{sc}^{PUSCH-initial}$ and $N_{symbol}^{PUSCH-initial}$.

Figure 9:
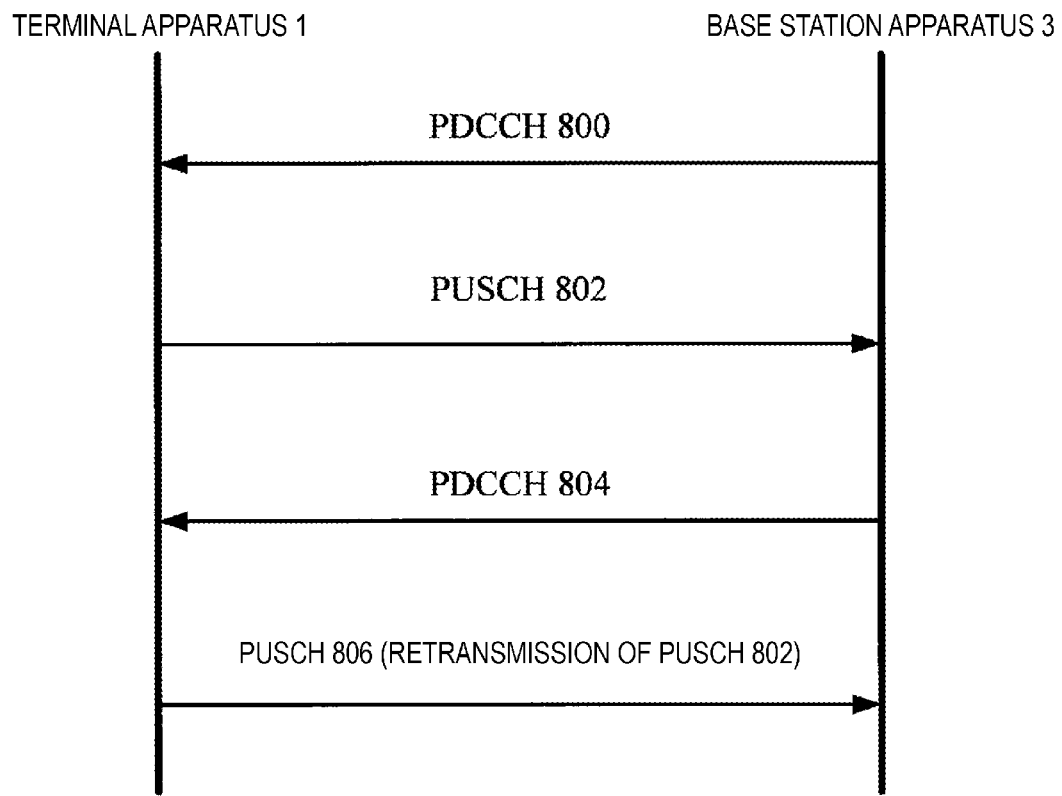
FIG. 9 is a diagram illustrating a first example of PUSCH initial transmission and initial PDCCH according to the present embodiment.

FIG. 9 is a diagram illustrating PUSCH initial transmission and the first example of initial PDCCH according to the present embodiment. The terminal apparatus 1 receives PDCCH 800 including an uplink grant indicating initial transmission. PDCCH 800 is also referred to as initial PDCCH 800. The terminal apparatus 1 transmits PUSCH 802 including the transport block x, based on detection of PDCCH 800. PUSCH 802 is also referred to as initial transmission PUSCH. The terminal apparatus 1 receives PDCCH 804 including an uplink grant indicating retransmission. Here, the CSI request field included in the uplink grant of PDCCH 804 may be set to trigger CSI reporting. The HARQ-ACK request field included in the uplink grant of PDCCH 804 may be set to trigger HARQ-ACK transmission. The terminal apparatus 1 transmits PUSCH 806 including the UCI (the CQI/PMI, the RI, and/or the HARQ-ACK) and the same transport block x, based on detection of PDCCH 804. PUSCH 806 is also referred to as retransmission PUSCH 806. PUSCH 806 corresponds to retransmission of the initial transmission PUSCH 802. Here, PDCCH 800, 804 and PUSCH 802, 806 correspond to the same HARQ process.

In FIG. 9, the number of coded bits Q of the CQI/PMI, the number of coded bits G of the RI, the number of coded bits H of the HARQ-ACK, and the transmit power for PUSCH 806, $P_{PUSCH,c}$ (i) are the bandwidth scheduled for PUSCH 802, and are given at least based on $M^{PUSCH\text{-}initial}{}_{sc}$ obtained from PDCCH 800 and the number of the SC-FDMA symbols for PUSCH 802 for the same transport block x, $N^{PUSCH\text{-}initial}{}_{symbol}$.

Figure 10:
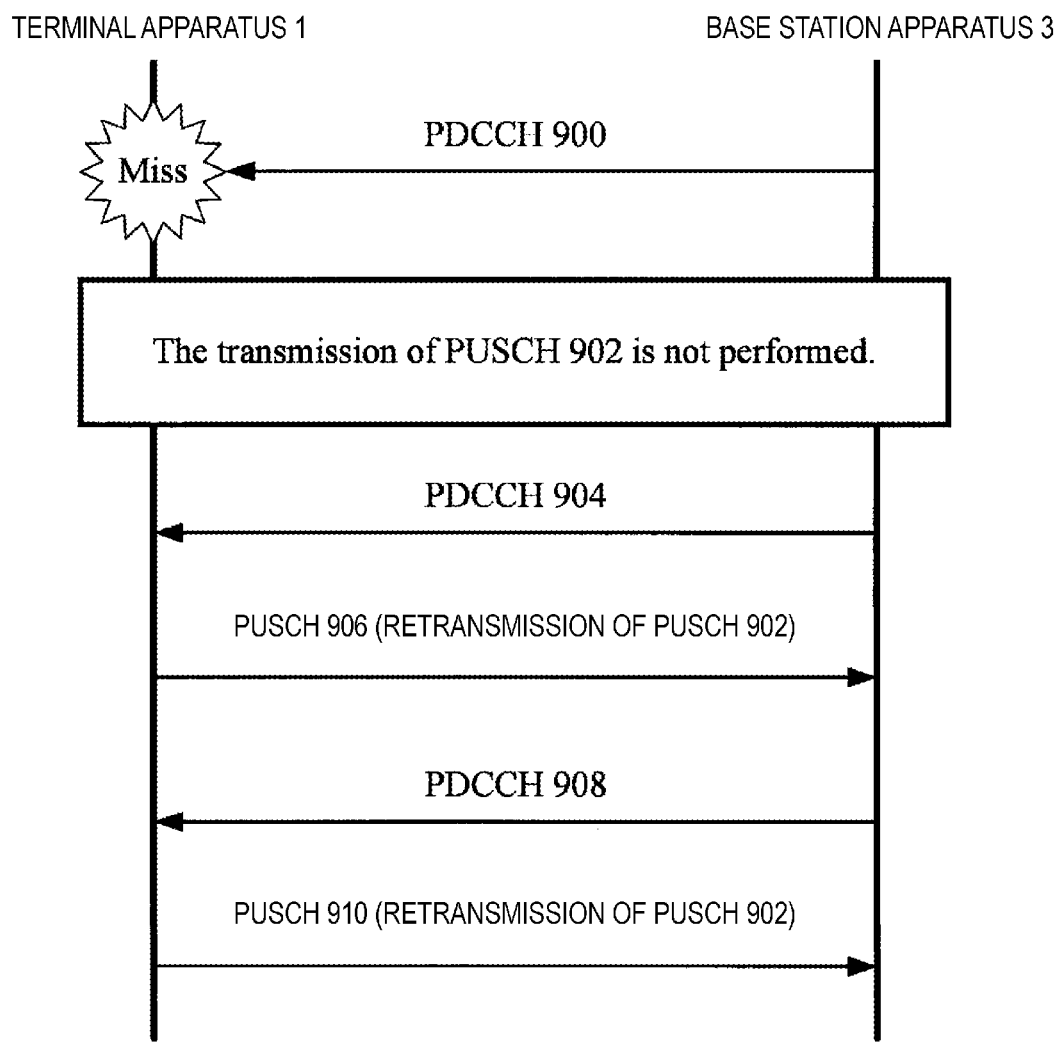
FIG. 10 is a diagram illustrating a second example of PUSCH initial transmission and initial PDCCH according to the present embodiment.

FIG. 10 is a diagram illustrating PUSCH initial transmission and the second example of initial PDCCH according to the present embodiment. The base station apparatus 3 transmits PDCCH 900 including an uplink grant indicating initial transmission. However, the terminal apparatus 1 does not transmit PUSCH 902 corresponding to PDCCH 900 by failing in detection of PDCCH 900. PDCCH 900 is also referred to as initial PDCCH 900. The terminal apparatus 1 receives PDCCH 904 including an uplink grant indicating transmission. The terminal apparatus 1 transmits PUSCH 906 including the transport block x, based on detection of PDCCH 904. PUSCH 906 is also referred to as retransmission PUSCH 906. PUSCH 906 corresponds to retransmission of PUSCH 902. The terminal apparatus 1 receives PDCCH 908 including an uplink grant indicating transmission. Here, the CSI request field included in the uplink grant of PDCCH 908 may be set to trigger CSI reporting. The HARQ-ACK request field included in the uplink grant of PDCCH 908 may be set to trigger HARQ-ACK transmission. The terminal apparatus 1 transmits PUSCH 910 including the UCI (the CQI/PMI, the RI, and/or the HARQ-ACK) and the transport block x, based on detection of PDCCH 908. PUSCH 910 is also referred to as retransmission PUSCH 910. PUSCH 910 corresponds to retransmission of PUSCH 902 and/or PUSCH 906. Here, PDCCH 900, 904, 908 and PUSCH 902, 906, 910 correspond to the same HARQ process.

In FIG. 10, in a case that PUSCH 902 based on PDCCH 900 is not transmitted, the number of coded bits Q of the CQI/PMI, the number of coded bits G of the RI, the number of coded bits H of the HARQ-ACK, and the transmit power for PUSCH 910, $P_{PUSCH,c}$ (i) are the bandwidth scheduled for PUSCH 906, and are given at least based on $M^{PUSCH\text{-}initial}{}_{sc}$ obtained from initial PDCCH 904 and the number of the SC-FDMA symbols for PUSCH 906 for the same transport block x, $N^{PUSCH\text{-}initial}{}_{symbol}$.

In FIG. 10, in a case that PUSCH 902 based on PDCCH 900 is performed, the number of coded bits Q of the CQI/PMI, the number of coded bits G of the RI, the number of coded bits H of the HARQ-ACK, and the transmit power for PUSCH 910, $P_{PUSCH,c}$ (i) may be the bandwidth scheduled for PUSCH 902, and be given at least based on $M^{PUSCH\text{-}initial}{}_{sc}$ obtained from PDCCH 900 and the number of the SC-FDMA symbols for PUSCH 902 for the same transport block x, $N^{PUSCH\text{-}initial}{}_{symbol}$.

Figure 11:
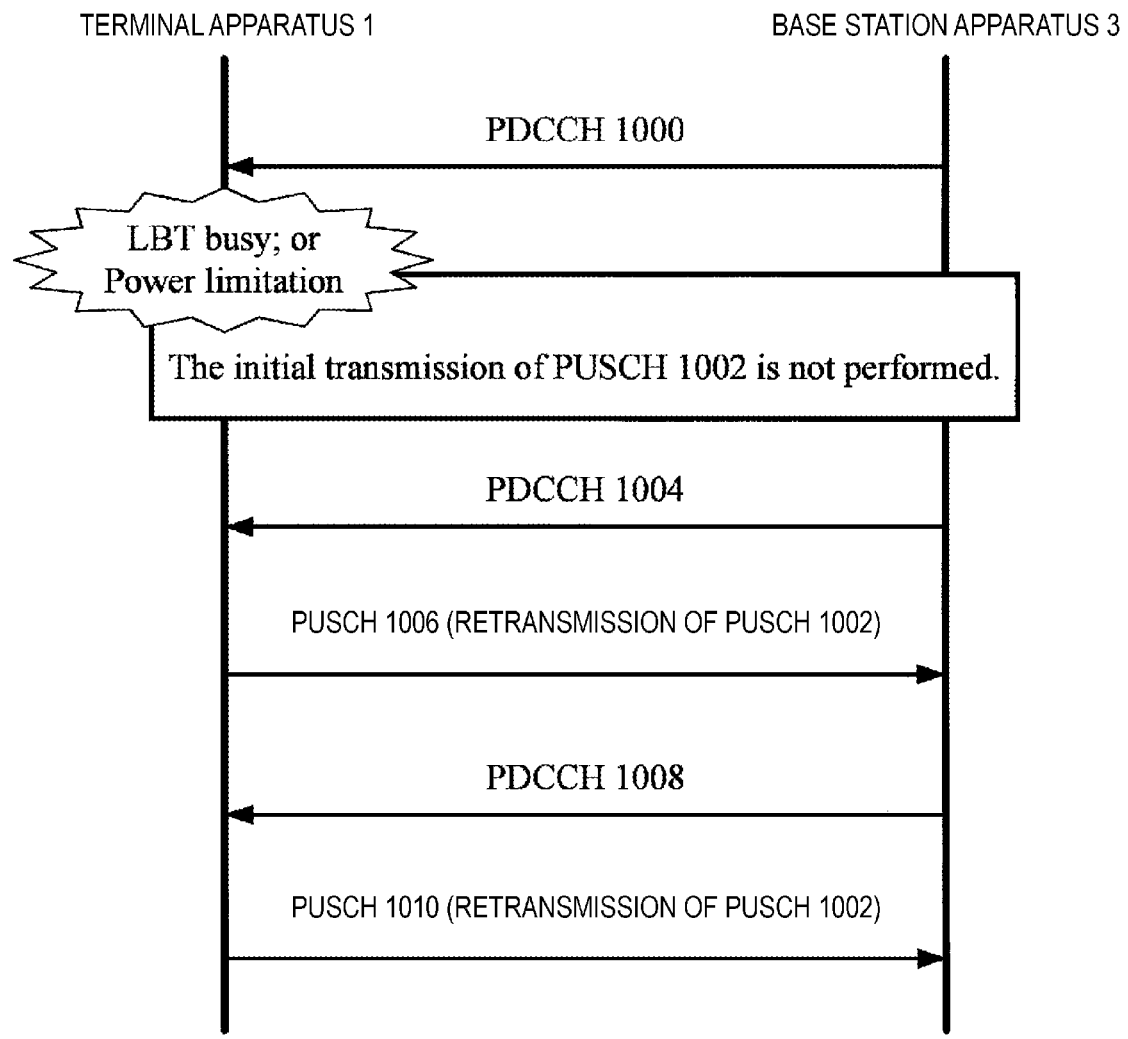
FIG. 11 is a diagram illustrating a third example of PUSCH initial transmission and initial PDCCH according to the present embodiment.

FIG. 11 is a diagram illustrating PUSCH initial transmission and the third example of initial PDCCH according to the present embodiment. The terminal apparatus 1 receives PDCCH 1000 including an uplink grant indicating initial transmission. PDCCH 1000 is also referred to as initial PDCCH 1000. However, the terminal apparatus 1 does not transmit PUSCH 1002 corresponding to PDCCH 1000. Here, PUSCH 1002 is also referred to as initial transmission PUSCH 1002.

For example, in a case that multiple PUSCHs including PUSCH 1002 are assigned in a certain subframe, and the total of the estimated transmit power of the multiple PUSCH transmissions exceeds the largest transmit power configured, the terminal apparatus 1 may set the transmit power for PUSCH 1002 to be 0, or may drop PUSCH 1002. For example, the terminal apparatus 1 may drop PUSCH 1002 in a case that a result of LBT (Listen Before Talk) corresponding to PUSCH 1002 is in a busy state.

The procedure of LBT is defined as the mechanism by which the terminal apparatus 1 applies a Clear Channel Assessment (CCA) check before the transmission in the serving cell. The terminal apparatus 1 performs power detection or signal detection to determine the presence or absence of other signals in the serving cell in order to identify whether the serving cell is in an idle state or in the busy state. The CCA is also referred to as a carrier sense. The terminal apparatus 1 performs measurement (detection) of interference power (interference signal, reception power, receiving signal, noise power, noise signal) and the like in the serving cell, before transmitting a physical channel and a physical signal using the serving cell (component carrier, channel, medium, frequency). The terminal apparatus 1 identifies (detects, assumes, determines) whether the serving cell is in the idle state or in the busy state, based on the measurement (the detection). In a case that the terminal apparatus 1 identifies that the serving cell is in the idle state, based on the measurement (the detection), the radio transmission and/or reception apparatus can transmit the physical channel and the physical signal in the serving cell. In a case that the serving cell is identified in the busy state based on the terminal apparatus 1, the radio transmission and/or reception apparatus does not transmit the physical channel and the physical signal in the serving cell.

In the procedure of LBT, the serving cell being in the busy state may mean that the interference power (or the mean of the interference power, the mean of the interference power in time and/or the frequency) detected in the prescribed radio resources of the serving cell exceeds (or is equal to or larger than) the threshold of LBT (or the threshold of the carrier sense, the threshold of the CCA, the threshold of the energy detection). The serving cell being in the idle state may mean the interference power detected in the prescribed radio resources of the serving cell does not exceed (or is equal to or smaller than) the threshold of LBT. Here, the prescribed radio resources may be given based on a prescribed time and a prescribed frequency. For example, the prescribed time may be 4 microseconds. The prescribed time may be 25 microseconds. The prescribed time may be 36 microseconds. The prescribed time may be 45 microseconds. The prescribed time may be defined as the smallest period used for the measurement of the reception power. The prescribed time may be given based on information included in the higher layer signaling transmitted by the base station apparatus 3 and/or information included in the DCI transmitted by the base station apparatus 3. The prescribed time may be given based on a counter (or a back off counter). The maximum of the counter is given by the maximum contention window ($CW_{max}$). The minimum of the counter is given by the minimum contention window ($CW_{min}$). The prescribed frequency may be given based on the band of the serving cell. The prescribed frequency may be given as a part of the band of the serving cell. The prescribed frequency may be given based on scheduling information included in the DCI transmitted by the base station apparatus 3.

A specific calculation method of the number of SC-FDMA symbols included in the PUSCH will be described below. Here, the SC-FDMA symbols included in the PUSCH may be the number of the SC-FDMA symbols used for generation of time continuous signals generated based on the contents of resource elements of the PUSCH.

The number of the SC-FDMA symbols included in the PUSCH transmitted by the terminal apparatus 1 may be given based on the procedure of LBT. For example, the number of the SC-FDMA symbols included in the PUSCH transmitted by the terminal apparatus 1 may be given based on configuration of the prescribed period for LBT (the prescribed period for LBT is also referred to as a LBT period).

In the transmission of the PUSCH scheduled by the base station apparatus 3, the LBT period for the PUSCH may be included in the transmission period of the PUSCH. Here, the LBT period being included in the transmission period of the PUSCH may mean that the LBT period or at least a part of the LBT period is included in a period configured for the PUSCH (1 ms period). The transmission period of the PUSCH may be the subframe where the transmission of the PUSCH is configured.

In the transmission of the PUSCH scheduled by the base station apparatus 3, the number of the SC-FDMA symbols included in the PUSCH transmitted by the terminal apparatus 1 may be given based on the configuration of the LBT period for the PUSCH. For example, in the transmission of the PUSCH scheduled by the base station apparatus 3, the number of the SC-FDMA symbols included in the PUSCH transmitted by the terminal apparatus 1 is given based on Equation (8) in a case that the LBT period and the transmission of the PUSCH are not configured in the same subframe.

$$N_{symb}^{PUSCH\text{-}initial} = (2 \cdot N_{symb}^{UL} - 1) - N_{SRS}) \quad \text{Equation (8)}$$

Here, $N_{symb}^{UL}$ is the number of the SC-FDMA symbols included in 1 slot. $N_{SRS}$ may be the number of the SC-FDMA symbols used for Sounding Reference Symbol (SRS) included in 1 subframe where the transmission of the PUSCH is configured. Here, the terminal apparatus 1 may trigger the transmission of the SRS periodically or by information/parameter received from the base station apparatus 3. The SRS is used for estimate of the channel in the uplink and the like. $N_{SRS}$ may be the number of the symbols used for SRS triggered periodically or by information/parameter received from the base station apparatus 3. It may be $N_{SRS}=1$ in a case that the transmission of the SRS is triggered, and $N_{SRS}=0$ in a case that the transmission of the SRS is not triggered. $N_{SRS}$ may be given by information/parameter received from the base station apparatus 3. $N_{SRS}$ may be given by information indicating the transmission Ending symbol included in DCI and used for scheduling the PUSCH (or subframe).

For example, in the transmission of the PUSCH scheduled by the base station apparatus 3, the number of the SC-FDMA symbols included in the PUSCH transmitted by the terminal apparatus 1 may be given based on Equation (9) in a case that the LBT period and the transmission of the PUSCH are configured in the same subframe.

$$N_{symb}^{PUSCH\text{-}initial} = (2 \cdot N_{symb}^{UL} - 1) - N_{SRS} - N_{LBT}) \quad \text{Equation (9)}$$

Here, $N_{LBT}$ may be the number of the SC-FDMA symbols corresponding to the contents of the resource elements which are not used for the generation of the time continuous signal. $N_{LBT}$ may be the number of the SC-FDMA symbols corresponding to the contents of the resource elements which are not used for the generation of the time continuous signal, due to the LBT period being configured. In the transmission of the PUSCH scheduled by the base station apparatus 3, it may be $N_{LBT}=1$ in a case that the LBT period and the transmission of the PUSCH are configured in the same subframe. In the transmission of the PUSCH scheduled by the base station apparatus 3, it may be $N_{LBT}=1$ in a case that the LBT period and the transmission of the PUSCH are configured in the same subframe, and the number of the SC-FDMA symbols corresponding to the contents of the resource elements which are not used for the generation of the time continuous signal is 1. In a case that the LBT period and the transmission of the PUSCH are not configured in the same subframe, the number of the SC-FDMA symbols of the PUSCH transmitted by the terminal apparatus 1 may be given based on Equation (9). In the transmission of the PUSCH scheduled by the base station apparatus 3, it may be $N_{LBT}=0$ in a case that the LBT period and the transmission of the PUSCH are not configured in the same subframe. In the transmission of the PUSCH scheduled by the base station apparatus 3, it may be $N_{LBT}=0$ in a case that the LBT period and the transmission of the PUSCH are not configured in the same subframe, and the number of the SC-FDMA symbols corresponding to the contents of the resource elements which are not used for the generation of the time continuous signal is 0. In the transmission of the PUSCH scheduled by the base station apparatus 3, it may be $N_{LBT}=X$ in a case that the LBT period and the transmission of the PUSCH are configured in the same subframe, and the number of the SC-FDMA symbols corresponding to the contents of the resource elements which are not used for the generation of the time continuous signal is X. Here, X is a fixed number.

Figure 12:
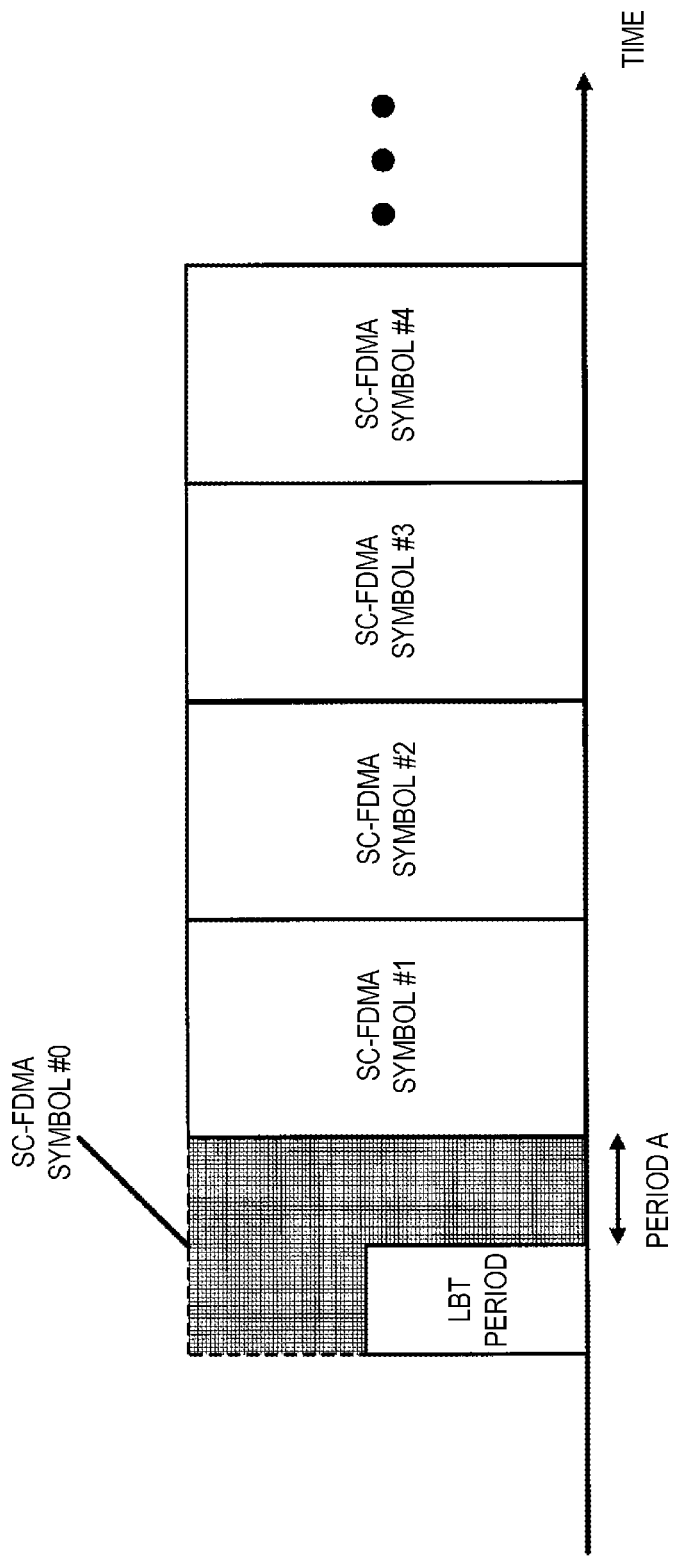
FIG. 12 is a diagram illustrating an example in which a LBT period is included in a period where a time continuous signal generated based on SC-FDMA symbol #0 is transmitted.

FIG. 12 is a diagram illustrating an example in which the LBT period is included in the period where the time continuous signal generated based on SC-FDMA symbol #0 (grid pattern) is transmitted (the period given based on the range of the time t in Equation (2)). As illustrated in FIG. 12, the LBT period may not be equal to the length of the period where the time continuous signal generated based on the SC-FDMA symbol is transmitted. For example, in an example illustrated in FIG. 12, the time continuous signal generated based on SC-FDMA symbol #1 is transmitted through the period A after the LBT period. Note that the sum of the LBT period and the period A may be equal to the length of the period where the time continuous signal generated based on the SC-FDMA symbol is transmitted. Here, in the period A, in a case that the transmission of the signal is not performed by the terminal apparatus 1, the channel after the period A may be reserved by a terminal apparatus which is not the terminal apparatus 1. Thus, the channel being reserved by multiple terminal apparatuses results in an element of transmission performance deterioration (a condition that multiple terminal apparatuses reserve a channel for LBT or CCA and performs transmission is also referred to as a collision). Here, the period A is also referred to as a gap of LBT (LBT gap) or a gap of CCA (CCA gap), and the like.

Thus it is preferable that transmission of a signal (PUSCH or a signal except PUSCH) is performed by the terminal apparatus 1 during the period A in FIG. 12 (also referred to as Channel reservation and the like). In the first operation of the period A according to one aspect of the present invention, the terminal apparatus 1 may transmit a dummy signal as a signal for channel reservation. A generation method of the dummy signal may be given based on the description of a specification and the like. The dummy signal may be generated based on a reference signal. The dummy signal being transmitted by the terminal apparatus 1 may be that power higher than a prescribed power is emitted outside the terminal apparatus 1. Here, the period A in FIG. 12 may correspond to the transmission period of the time continuous signal of the first SC-FDMA symbol.

On the other hand, the dummy signal transmitted by the terminal apparatus 1 is not used for calculation of transmission coding rate (or Bit Per Resource Element (BPRE)) of the transport block included in the PUSCH. That is, it is preferable that the dummy signal is not considered in calculation of the number of coded bits Q of the CQI/PMI, the number of coded bits G of the RI, the number of coded bits H of the HARQ-ACK, and/or the transmit power of the PUSCH. Thus, it may be $N_{LBT}=1$ in a case that the dummy signal is transmitted by the terminal apparatus 1 during the period A in FIG. 12. It may be $N_{LBT}=X$ in a case that the dummy signal is transmitted in the X SC-FDMA symbols by the terminal apparatus 1.

That is, it may be $N_{LBT}=1$ in a case that the LBT period is configured, the time continuous signal generated based on the first SC-FDMA symbol is not transmitted, and the dummy signal is transmitted during at least a part of the LBT period. It may be $N_{LBT}=0$ in a case that the time continuous signal generated based on the first SC-FDMA symbol due to LBT period being configured is not transmitted, and the dummy signal is not transmitted in the LBT period. Here, the first SC-FDMA symbol may be one or multiple SC-FDMA symbols. That is, it may be $N_{LBT}=X$ in a case that the first SC-FDMA symbol corresponds to the X SC-FDMA symbols, and the dummy signal is transmitted during at least a part of the LBT period. It may be $N_{LBT}=0$ in a case that the first SC-FDMA symbol corresponds to the X SC-FDMA symbols, and the dummy signal is not transmitted during the LBT period.

In the first operation of the period A in FIG. 12 according to one aspect of the present invention, the terminal apparatus 1 may transmit a signal where CP of SC-FDMA symbol #1 is extended (Extension of cyclic prefix of the next SC-FDMA symbol) (CP extended outside the SC-FDMA symbol or extended CP). Here, the extended CP may not be used for the calculation of the transmission coding rate of the transport block included in the PUSCH. This results from that CP is used for interference cancellation by multi-path fading particular to radio transmission environment. That is, it is preferable that the transmit power of the signal where CP of SC-FDMA symbol #1 is extended is not considered in the calculation of the number of coded bits Q of the CQI/PMI, the number of coded bits G of the RI, the number of coded bits H of the HARQ-ACK, and/or the transmit power for the PUSCH. Thus, it may be $N_{LBT}=1$ in a case that CP extended by the terminal apparatus 1 is transmitted during the period A in FIG. 12. It may be $N_{LBT}=X$ in a case that extended CP is transmitted in the X SC-FDMA symbols by the terminal apparatus 1.

That is, it may be $N_{LBT}=1$ in a case that the first SC-FDMA symbol is not transmitted due to the LBT period being configured, and the extended CP of the second SC-FDMA symbol following the first SC-FDMA symbol is transmitted during at least a part of the period A in FIG. 12. It may be $N_{LBT}=0$ in a case that the first SC-FDMA symbol is not transmitted due to the LBT period being configured, and the extended CP of the second SC-FDMA symbol following the first SC-FDMA symbol is not transmitted during the period A in FIG. 12. Here, the first SC-FDMA symbol may be multiple SC-FDMA symbols. That is, it may be $N_{LBT}=X$ in a case that the first SC-FDMA symbol corresponds to the X SC-FDMA symbols, and the extended CP of the second SC-FDMA symbol following the first SC-FDMA symbol is transmitted during at least a part of the period A in FIG. 12. It may be $N_{LBT}=0$ in a case that the first SC-FDMA symbol corresponds to the X SC-FDMA symbols, and the extended CP of the second SC-FDMA symbol following the first SC-FDMA symbol is not transmitted during the period A in FIG. 12.

A specific example of the extended CP of the second SC-FDMA symbol $1_{second}$ following the first SC-FDMA symbol 1 will be described by using an example in which the first SC-FDMA symbol is SC-FDMA symbol 1, and the second SC-FDMA symbol is SC-FDMA symbol $1_{second}$. The extended CP of the second SC-FDMA symbol $1_{second}$ following the first SC-FDMA symbol 1 is also referred to as an extended CP below. The extended CP of the second SC-FDMA symbol following the first SC-FDMA symbol 1 may be given by extending a normal CP corresponding to $N_{CP,l}=144$ or $N_{CP,l}=160$ or an extended CP corresponding to $N_{CP,l}=512$. Here, for example, it may be $1_{second}=1+1$.

For example, the extended CP of the second SC-FDMA symbol $1_{second}$ following the first SC-FDMA symbol 1 may be generated based on Equation (2). Here, $N^X_{CP,l}$ used for the extended CP of the second SC-FDMA symbol $1_{second}$ following the first SC-FDMA symbol 1 may have a value (e.g., 320) except 160 in a case of l=0. $N^X_{CP,l}$ used for the extended CP of the second SC-FDMA symbol $1_{second}$ following the first SC-FDMA symbol 1 may be a value (e.g., 288) except 144 in a case of l=1 to 6. $N^X_{CP,l}$ used for the extended CP of the second SC-FDMA symbol $1_{second}$ following the first SC-FDMA symbol 1 may be a value (e.g., 1024) except 512 in a case of l=0 to 6. Time $T_{1,0}$ where the transmission of the first SC-FDMA symbol 1 is started, used for the extended CP of the second SC-FDMA symbol $1_{second}$ following the first SC-FDMA symbol 1, may be given based on LBT. For example, in a case that the LBT for the PUSCH including the first SC-FDMA symbol 1 finishes in time $T_{LBT}$, time $T_{1,0}$ where the transmission of the first SC-FDMA symbol 1 is started, used for the extended CP of the second SC-FDMA symbol $1_{second}$ following the first SC-FDMA symbol 1, may be $T_{1,0}=T_{LBT}+T_s+T_n$. That is, in a case that the transmission of the extended CP of the second SC-FDMA symbol $1_{second}$ following the first SC-FDMA symbol 1 is configured, the time continuous signal of first SC-FDMA symbol 1 may be given based on the contents of the resource elements corresponding to the second SC-FDMA symbol $1_{second}$.

$N_{LBT}$ may be given based on whether the continuous time signal of the first SC-FDMA symbol 1 is generated based on the contents of the resource elements corresponding to the first SC-FDMA symbol. For example, it may be $N_{LBT}=1$ in a case that the time continuous signal of the first SC-FDMA symbol 1 is generated based on the contents of the resource elements corresponding to the first SC-FDMA symbol. It may be $N_{LBT}=1$ in a case that the time continuous signal of the first SC-FDMA symbol 1 is generated based on the contents of the resource elements corresponding to the second SC-FDMA symbol $1_{second}$. It may be $N_{LBT}=X$ in a case that the time continuous signals of the x first SC-FDMA symbols 1 are generated based on the contents of the resource elements corresponding to the second SC-FDMA symbol.

$N_{LBT}$ may be given based on NULL ($O_m$) substituted for a modulation symbol in Equation (1). For example, $N_{LBT}$ may be given based on the number of NULLs substituted for a modulation symbol in Equation (1). $N_{LBT}$ may be $N_{LBT}=N_{NULL}/Nsc$ in a case that the number of NULLs substituted for the modulation symbol in Equation (1) is $N_{NULL}$. Here, $N_{sc}$ is the number of subcarriers of the SC-FDMA symbol included in the PUSCH scheduled by the base station apparatus 3. It may be $N_{LBT}=N_{NULL}/Nsc$ in a case that the LBT period and the transmission of the PUSCH are configured in the same subframe, in the transmission of the PUSCH scheduled by the base station apparatus 3, and $N_{NULL}$ NULLs are substituted for the modulation symbol, in a modulation symbol generating the contents of the resource elements corresponding to the Y SC-FDMA symbols included in the PUSCH. It may be $N_{LBT}=X+N_{NULL}/(N_{sc}*Y)$ in a case that the LBT period and the transmission of the PUSCH are configured in the same subframe, in the transmission of the PUSCH scheduled by the base station apparatus 3, the time continuous signal generated based on the X SC-FDMA symbols included in the PUSCH is not transmitted, and $N_{NULL}$ NULLs are substituted for the modulation symbol, in a modulation symbol generating the contents of the resource elements corresponding to the Y SC-FDMA symbols included in the PUSCH. Here, for example, it may be X=0 and Y=1. That is, it may be $N_{LBT}=N_{NULL}/(N_{sc}*Y)$ in a case that the LBT period and the transmission of the PUSCH are configured in the same subframe, in the transmission of the PUSCH scheduled by the base station apparatus 3, and $N_{NULL}$ NULLs are substituted for the modulation symbol, in a modulation symbol generating the contents of the resource elements corresponding to the Y SC-FDMA symbols included in the PUSCH. Here, for example, it may be Y=1.

In $N_{LBT}$, the actual transmission period of the time continuous signal may be different from the length of the time continuous signal generated based on the contents of the resource elements corresponding to the SC-FDMA symbol. Here, $N_{LBT}$ may be given based on the transmission period. Here, the transmission period $T_{tx}$ may be given by $T_{tx}=(N_{CP,l}+N)*T_s-T_{1,0}$. Here, the time continuous signal may include a range from $T_{1,0}$ to $(N_{CP,l}+N)*T_s$. That is, the transmission timing of the time continuous signal may be $T_{1,0}$. The transmission period $T_{tx}$ may be given based on the generated time signal. For example, $N_{LBT}$ may be given by $N_{LBT}=T_{tx}/T_{symbol}$. Here, $T_{symbol}$ may be the length of the generated time continuous signal. For example, $T_{symbol}$ may be given by $T_{symbol}=(2,048+N_{CP,l})*T_s$.

The transmission timing of the time continuous signal $T_{1,0}$ may be given by $T_{1,0}=T_{initial}+T_n$ in a case that the actual transmission period of the time continuous signal is different from the length of the time continuous signal generated based on the contents of the resource elements corresponding to the SC-FDMA symbol. Here, $T_{initial}$ may be the time indicating the top (or the top sampling point) of the generated time continuous signal. $T_n$ is a value indicating a value of a positive or negative error of the transmission timing. The error of the transmission timing is an error brought by some of devices included in the terminal apparatus 1 and/or the base station apparatus 3, such as synchronization error, transition time of the transmission and/or reception, the clock error.

$N_{LBT}$ may be given based on information included in the higher layer signaling transmitted by the base station apparatus 3 and/or information included in the DCI transmitted by the base station apparatus 3. For example, X may be given based on information included in the higher layer signaling transmitted by the base station apparatus 3 and/or information included in the DCI transmitted by the base station apparatus 3. Y may be given based on information included in the higher layer signaling transmitted by the base station apparatus 3 and/or information included in the DCI transmitted by the base station apparatus 3. The number of NULLs $N_{NULL}$ substituted for a modulation symbol may be given based on information included in the higher layer signaling transmitted by the base station apparatus 3 and/or information included in the DCI transmitted by the base station apparatus 3. Information included in the higher layer signaling transmitted by the base station apparatus 3, and/or information included in the DCI transmitted by the base station apparatus 3 may be information indicating that some SC-FDMA symbols included in the PUSCH are not transmitted.

A symbol being transmitted by the terminal apparatus 1 may mean that the terminal apparatus 1 emits power that exceeds (or is equal to or larger than) a prescribed power (or mean power, power density, power strength, electric field strength, electric wave strength, electric field density, electric wave density, and the like) outside the terminal apparatus 1 in a prescribed time and a prescribed frequency corresponding to the PUSCH. Specifically, the symbol being transmitted by the terminal apparatus 1 may mean that power in a prescribed time and a prescribed frequency corresponding to the radio resources for the symbol is higher than emitted power other than the prescribed time and/or frequency other than the prescribed frequency. Here, the prescribed power may be −39 dBm. The prescribed power may be −30 dBm. The prescribed power may be −72 dBm. In one aspect of the present invention, the prescribed power is not limited.

The drop process of PUSCH 1002 may be performed by radio transmission and/or reception unit 10. In a case that the transmission of PUSCH 1002 is dropped by the radio transmission and/or reception unit 10, the higher layer processing unit 14 may consider that the transmission of PUSCH 1002 was performed. For example, the higher layer processing unit 14 may generate a transport block x for the transmission of PUSCH 1002. For example, it retains an uplink grant included in PDCCH 1000 and may direct the radio transmission and/or reception unit 10 for retransmission of the transport block x based on the retained uplink grant.

The terminal apparatus 1 receives PDCCH 1004 including an uplink grant indicating retransmission. The terminal apparatus 1 performs PUSCH 1006 including the transport block x, based on detection of PDCCH 1004. PUSCH 1006 is also referred to as retransmission PUSCH 1006. PUSCH 1006 corresponds to retransmission of PUSCH 1002.

The terminal apparatus 1 receives PDCCH 1008 including an uplink grant indicating retransmission. Here, the CSI request field included in the uplink grant of PDCCH 1008 may be set to trigger CSI reporting. The HARQ-ACK request field included in the uplink grant of PDCCH 1008 may be set to trigger HARQ-ACK transmission. The terminal apparatus 1 transmits PUSCH 1010 including the UCI (the CQI/PMI, the RI, and/or the HARQ-ACK) and the transport block x, based on detection of PDCCH 1008. PUSCH 1010 is also referred to as retransmission PUSCH 1010. PUSCH 1010 corresponds to retransmission of PUSCH 1002 and/or PUSCH 1006. Here, PDCCH 1000, 1004, 1008, and PUSCH 1002, PUSCH 1006, 1010 correspond to the same HARQ process.

In FIG. 11, the number of coded bits Q of the CQI/PMI, the number of coded bits G of the RI, the number of coded bits H of the HARQ-ACK, and the transmit power for PUSCH 1010, $P_{PUSCH,c}(i)$ may be the bandwidth scheduled for PUSCH 1002, and be given at least based on $M^{PUSCH-initial}_{sc}$ obtained from PDCCH 1000 and the number of the SC-FDMA symbols for PUSCH 1002 for the same transport block x, $N^{PUSCH-initial}_{symbol}$.

However, the base station apparatus 3 cannot know whether the reason why PUSCH 1002 was not performed is because (i) the terminal apparatus 1 failed in the detection of initial PDCCH 1000, (ii) the result of LBT is a busy state, or (iii) the total of the estimated transmit powers of multiple PUSCH transmissions including PUSCH 1002 exceeds the maximum transmit power configured. Thus, it is not preferable for the number of coded bits Q of the CQI/PMI, the number of coded bits G of the RI, the number of coded bits H of the HARQ-ACK, and the transmit power for PUSCH 1006, $P_{PUSCH,c}$ (i) to vary depending on the reason why the transmission of PUSCH 1002 was not performed. Thus, in FIG. 11, even if the detection of PDCCH 1000 was successfully completed, in a case that transmission of PUSCH 1002 based on PDCCH 1000 is not performed, the number of coded bits Q of the CQI/PMI, the number of coded bits G of the RI, the number of coded bits H of the HARQ-ACK, and the transmit power for PUSCH 1010, $P_{PUSCH,c}$ (i) may be the bandwidth scheduled for PUSCH 1006, and be given at least based on $M^{PUSCH\text{-}initial}_{sc}$ obtained from PDCCH 1004 and the number of the SC-FDMA symbols for PUSCH 1006 for the same transport block x, $N^{PUSCH\text{-}initial}_{symbol}$. Thereby, the base station apparatus 3 can correctly receive PUSCH 1006 (the UCI and the transport block) even if it does not know the reason why the transmission of PUSCH 1002 was not performed by the terminal apparatus 1. Here, in a case that the reason why PUSCH 1002 was not performed is because (ii) the result of the LBT is a busy state, PUSCH 1006 is also referred to as a PUSCH initial transmission. That is, in a case that the reason why PUSCH 1002 was not performed is because (ii) the result of the LBT is a busy state, PDCCH 1004 may be an initial PDCCH.

In FIG. 11, in a case that transmission of PUSCH 1002 based on PDCCH 1000 is performed, the number of coded bits Q of the CQI/PMI, the number of coded bits G of the RI, the number of coded bits H of the HARQ-ACK, and the transmit power for PUSCH 1010, $P_{PUSCH,c}$ (i) may be the bandwidth scheduled for PUSCH 1002, and be given at least based on $M^{PUSCH\text{-}initial}_{sc}$ obtained from PDCCH 1000 and the number of the SC-FDMA symbols for PUSCH 1002 for the same transport block x, $N^{PUSCH\text{-}initial}_{symbol}$.

Some or all of the following element A to element I may be given at least based on the number of SC-FDMA symbols included in the PUSCH. Some or all of the following element A to element I may be given based on the generation method of the time continuous signal generated based on the contents of the resource elements corresponding to the SC-FDMA symbol included in the PUSCH. Some or all of the following element A to element I may be given based on the number of NULLs inserted into a modulation symbol generating the contents of the resource elements used for the generation of the SC-FDMA symbol included in the PUSCH. Some or all of the following element A to element I may be given based on the transmission period in a case that the actual transmission period of the time continuous signal is different from the length of the time continuous signal generated based on the contents of the resource elements corresponding to the SC-FDMA symbol.

Element A: the number of coded bits Q of the CQI/PMI transmitted on the PUSCH

Element B: the number of coded bits G of the RI transmitted on the PUSCH

Element C: the number of coded bits H of the HARQ-ACK transmitted on the PUSCH

Element D: the transmit power for PUSCH 802, $P_{PUSCH,c}$ (i)

Element E: the transmit power for PUSCH 806, $P_{PUSCH,c}$ (i)

Element F: the transmit power for PUSCH 906, $P_{PUSCH,c}$ (i)

Element G: the transmit power for PUSCH 910, $P_{PUSCH,c}$ (i)

Element H: the transmit power for PUSCH 1006, $P_{PUSCH,c}$ (i)

Element I: the transmit power for PUSCH 1010, $P_{PUSCH,c}$ (i)

Here, the number of SC-FDMA symbols of the PUSCH may be given based on the configuration of the LBT period. For example, the number of SC-FDMA symbols of the PUSCH may be given based on whether the transmission of the PUSCH and the LBT period are configured in the same subframe. For example, the number of SC-FDMA symbols of the PUSCH may be given based on the number of the SC-FDMA symbols $N_{LBT}$ of the PUSCH which is not transmitted due to the LBT period being configured. For example, the number of SC-FDMA symbols $N_{LBT}$ of the PUSCH which is not transmitted due to the LBT period being configured may be 1 in a case that the transmission of the PUSCH and the LBT period are configured in the same subframe. The number of SC-FDMA symbols $N_{LBT}$ of the PUSCH which is not transmitted due to the LBT period being configured may be 0 in a case that the transmission of the PUSCH and the LBT period are not configured in the same subframe.

Hereinafter, various aspects of the terminal apparatus 1 and the base station apparatus 3 according to the present embodiment will be described.

(1) According to some aspects of the present invention, the following measures are provided. Specifically, the first aspect of the present invention is a terminal apparatus 1 including: a transmitter transmitting a PUSCH (802, 806, 902, 906, 9010, 1002, 1006, 1010) based on LBT of a prescribed period; and a physical layer processing unit calculating a number of bits of an uplink control information included in the PUSCH (802, 806, 902, 906, 9010, 1002, 1006, 1010), wherein: the number of bits of the uplink control information is given at least based on some or all of a first element, a second element, a third element, a fourth element, and a fifth element; the first element is the number of SC-FDMA symbols included in the PUSCH (802, 806, 902, 906, 9010, 1002, 1006, 1010); the second element is whether a time continuous signal of a first SC-FDMA symbol included in the SC-FDMA symbol is generated based on a content of a resource element corresponding to the first SC-FDMA symbol; the third element is a number of NULL inserted into a modulation symbol generating the contents; the fourth element is a transmission period of the time continuous signal; and the fifth element is whether transmission of the PUSCH (802, 806, 902, 906, 9010, 1002, 1006, 1010) and the prescribed period are configured in the same subframe.

(2) The second aspect of the present invention is a base station apparatus 3 including: a physical layer processing unit calculating a number of bits of uplink control information included in PUSCH (802, 806, 902, 906, 9010, 1002, 1006, 1010); and a receiver receiving the PUSCH (802, 806, 902, 906, 9010, 1002, 1006, 1010) based on a number of bits of the uplink control information calculated by the physical layer processing unit, wherein: the number of bits of the uplink control information is given at least based on some or all of a first element, a second element, a third element, a fourth element, and a fifth element; the first element is the number of SC-FDMA symbols included in the PUSCH (802, 806, 902, 906, 9010, 1002, 1006, 1010); the second element is whether a time continuous signal of a first SC-FDMA symbol included in the SC-FDMA symbol is generated based on a content of a resource element corresponding to the first SC-FDMA symbol; the third element is a number of NULL inserted into a modulation symbol generating the contents; the fourth element is a transmission period of the time continuous signal; and the fifth element is whether transmission of the PUSCH (802, 806, 902, 906, 9010, 1002, 1006, 1010) and the prescribed period are configured in the same subframe.

(3) The third aspect of the present invention is a terminal apparatus 1 including: a transmitter transmitting a PUSCH (802, 806, 902, 906, 9010, 1002, 1006, 1010) based on LBT of a prescribed period; and a physical layer processing unit calculating transmit power of the PUSCH (802, 806, 902, 906, 9010, 1002, 1006, 1010), wherein: the transmit power is given at least based on some or all of a first element, a second element, a third element, a fourth element, and a fifth element; the first element is the number of SC-FDMA symbols included in the PUSCH (802, 806, 902, 906, 9010, 1002, 1006, 1010); the second element is whether a time continuous signal of a first SC-FDMA symbol included in the SC-FDMA symbol is generated based on a content of a resource element corresponding to the first SC-FDMA symbol; the third element is a number of NULL inserted into a modulation symbol generating the contents; the fourth element is a transmission period of the time continuous signal; and the fifth element is whether transmission of the PUSCH (802, 806, 902, 906, 9010, 1002, 1006, 1010) and the prescribed period are configured in the same subframe.

(4) The fourth aspect of the present invention is a base station apparatus 3 including: a physical layer processing unit calculating transmit power of a PUSCH (802, 806, 902, 906, 9010, 1002, 1006, 1010); and a receiver receiving the PUSCH (802, 806, 902, 906, 9010, 1002, 1006, 1010) based on the transmit power calculated by the physical layer processing unit, wherein: the transmit power is given at least based on some or all of a first element, a second element, a third element, a fourth element, and a fifth element; the first element is the number of SC-FDMA symbols included in the PUSCH (802, 806, 902, 906, 9010, 1002, 1006, 1010); the second element is whether a time continuous signal of a first SC-FDMA symbol included in the SC-FDMA symbol is generated based on a content of a resource element corresponding to the first SC-FDMA symbol; the third element is a number of NULL inserted into a modulation symbol generating the contents; the fourth element is a transmission period of the time continuous signal; and the fifth element is whether transmission of the PUSCH (802, 806, 902, 906, 9010, 1002, 1006, 1010) and the prescribed period are configured in the same subframe.

(5) In the first to fourth aspects of the present embodiment, a continuous signal of the first SC-FDMA symbol is an extended CP of the second SC-FDMA symbol in a case that a time continuous signal of the first SC-FDMA symbol is generated based on contents of resource elements corresponding to a second SC-FDMA symbol following the first SC-FDMA symbol.

(1A) One aspect of the present invention is a terminal apparatus including: a transmitter configured to transmit a transport block on PUSCH; and a physical layer processing unit configured to calculate transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(2A) One aspect of the present invention is a base station apparatus including: a receiver configured to receive a transport block transmitted on PUSCH; and a physical layer processing unit configured to calculate transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(3A) One aspect of the present invention is a communication method used for a terminal apparatus, the communication method including the steps of: transmitting a transport block on PUSCH; and calculating transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(4A) One aspect of the present invention is a communication method used for a base station apparatus, the communication method including the steps of: receiving a transport block transmitted on PUSCH; and calculating transmit power of the PUSCH, at least based on a number of SC-FDMA symbols $N^{PUSCH\text{-}initial}_{symb}$ for PUSCH initial transmission for the transport block, wherein the number of the SC-FDMA symbols $N^{PUSCH\text{-}initial}_{symb}$ is given at least based on $N_{LBT}$ and a number of SC-FDMA symbols $N^{UL}_{symb}$ included in an uplink slot, and a value of $N_{LBT}$ is 1 in a case that a time continuous signal of a first SC-FDMA symbol included in the PUSCH is generated based on a content of a resource element corresponding to a second SC-FDMA symbol following the first SC-FDMA symbol.

(5A) In one aspect of the present invention, a value of $N_{LBT}$ is 0 in a case that the time continuous signal of the first SC-FDMA symbol included in the PUSCH is not based on the contents of the resource element corresponding to the second SC-FDMA symbol following the first SC-FDMA symbol.

With any of the configurations or methods, the terminal apparatus 1 can efficiently perform the uplink transmission. The base station apparatus 3 can efficiently receive the uplink transmission.

A program running on a base station apparatus 3 and a program running on a terminal apparatus 1 according to one aspect of the present invention may be a program that controls a Central Processing Unit (CPU) and the like, such that the program causes a computer to operate in such a manner as to realize the functions of the above-described embodiment according to one aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment can be realized as an aggregation (a device group) constituted of multiple devices. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may be an Evolved Universal Terrestrial Radio Access Network (EUTRAN). Furthermore, the base station apparatus 3 according to the above-described embodiment may have some or all portions of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be utilized in, for example, a communication system, a communications apparatus (e.g., a mobile apparatus, a base station apparatus, a wireless LAN device, or a sensor device), an integrated circuit (e.g., a communication chip), or program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
3000 Transmission process
3001 Coding
3002 Scrambling
3003 Modulation mapper
3004 Layer mapper
3005 Transform precoder
3006 Precoder
3007 Resource element mapper
3008 Baseband signal generation
800, 804, 900, 904, 908, 1000, 1004, 1008 PDCCH
802, 806, 902, 906, 9010, 1002, 1006, 1010 PUSCH

The invention claimed is:
1. A terminal apparatus comprising:
transmission circuitry configured to and/or programmed to transmit a transport block on a Physical Uplink Shared Channel (PUSCH), and
physical layer processing circuitry configured to and/or programmed to determine transmit power for the PUSCH at least based on a number of Single Carrier (SC)-Frequency Division Multiple Access (FDMA)

symbols $N^{PUSCH\text{-}initial}_{symb}$ for an initial transmission of the PUSCH for the transport block, wherein:

the number of the SC-FDMA symbols $N^{PUSCH\text{-}initial}_{symb}$ is given based on $N_{LBT}$ and a number of SC-FDMA symbols included in a uplink slot $N^{UL}_{symb}$, and the $N_{LBT}$ is 1 in a case that a signal of a SC-FDMA symbol with index l is generated based on a content for resource elements corresponding to a SC-FDMA symbol with index l+1.

2. The terminal apparatus according to claim 1, wherein the $N_{LBT}$ is 0 in a case that a signal of a SC-FDMA symbol with index l is not generated based on a content for resource elements corresponding to a SC-FDMA symbol with index l+1.

3. A base station apparatus comprising:

reception circuitry configured to and/or programmed to receive a transport block on a Physical Uplink Channel (PUSCH), and physical layer processing circuitry configured to and/or programmed to determine transmit power for the PUSCH at least based on a number of Single Carrier (SC)-Frequency Division Multiple Access (FDMA) symbols $N^{PUSCH\text{-}initial}_{symb}$ for an initial transmission of the PUSCH for the transport block, wherein:

the number of the SC-FDMA symbols $N^{PUSCH\text{-}initial}_{symb}$ is given based on $N_{LBT}$ and a number of SC-FDMA symbols included in a uplink slot $N^{UL}_{symb}$, and the $N_{LBT}$ is 1 in a case that a signal of a SC-FDMA symbol with index l is generated based on a content for resource elements corresponding to a SC-FDMA symbol with index l+1.

4. The base station apparatus according to claim 3, wherein the $N_{LBT}$ is 0 in a case that a signal of a SC-FDMA symbol with index l is not generated based on a content for resource elements corresponding to a SC-FDMA symbol with index l+1.

5. A communication method used for a terminal apparatus, comprising:

transmitting a transport block on a Physical Uplink Shared Channel (PUSCH), and determining transmit power for the PUSCH at least based on a number of Single Carrier (SC)-Frequency Division Multiple Access (FDMA) symbols $N^{PUSCH\text{-}initial}_{symb}$ for an initial transmission of the PUSCH for the transport block, wherein:

the number of the SC-FDMA symbols $N^{PUSCH\text{-}initial}_{symb}$ is given based on $N_{LBT}$ and a number of SC-FDMA symbols included in an uplink slot $N^{UL}_{symb}$, and the $N_{LBT}$ is 1 in a case that a signal of a SC-FDMA symbol with index l is generated based on a content for resource elements corresponding to a SC-FDMA symbol with index l+1.

6. A communication method used for a base station apparatus, comprising:

receiving a transport block on a Physical Uplink Shared Channel (PUSCH), and determining transmit power for the PUSCH at least based on a number of Single Carrier (SC)-Frequency Division Multiple Access (FDMA) symbols $N^{PUSCH\text{-}initial}_{symb}$ for an initial transmission of the PUSCH for the transport block, wherein:

the number of the SC-FDMA symbols $N^{PUSCH\text{-}initial}_{symb}$ is given based on $N_{LBT}$ and a number of SC-FDMA symbols included in an uplink slot $N^{UL}_{symb}$, and the $N_{LBT}$ is 1 in a case that a signal of a SC-FDMA symbol with index l is generated based on a content for resource elements corresponding to a SC-FDMA symbol with index l+1.

\* \* \* \* \*